United States Patent
Barker et al.

(10) Patent No.: US 6,363,421 B2
(45) Date of Patent: Mar. 26, 2002

(54) METHOD FOR COMPUTER INTERNET REMOTE MANAGEMENT OF A TELECOMMUNICATION NETWORK ELEMENT

(75) Inventors: William E. Barker, Geneva; Lisa M. Connelly, Lisle; Marvin A. Eggert, Aurora; Michael P. Foley, Elmwood Park; Kenneth R. Macfarlane, Wheaton; Philip M. Parsons, Lisle; Girish Rai; Jerome E. Rog, both of Bartlett; Kurt A. Vangsness, Aurora, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/088,463

(22) Filed: May 31, 1998

(51) Int. Cl.[7] .................... G06F 15/16; G06F 15/173
(52) U.S. Cl. ............... 709/223; 709/202; 709/224; 709/232; 709/235
(58) Field of Search ................ 709/224, 200, 709/250, 223, 318, 232, 235, 202; 370/245

(56) References Cited

U.S. PATENT DOCUMENTS 5,732,218 A * 3/1998 Bland et al. ............... 395/200
5,742,762 A * 4/1998 Scholl et al. ............... 395/200
5,812,529 A * 9/1998 Czarnik et al. ............. 370/245
5,887,139 A * 3/1999 Madison, Jr. et al. ...... 395/200
6,018,625 A * 1/2000 Hayball et al. ............. 395/500
6,182,157 B1 * 1/2001 Schlener et al. ............ 709/318

OTHER PUBLICATIONS

William Stallings, SNMP, SNMPv2, and RMON Practical Network Management, 78–80, 241–251, 262–263, Nov. 1997.*

* cited by examiner

Primary Examiner—Mark H. Rinehart
Assistant Examiner—Paul Kang

(57) ABSTRACT

In accordance with the invention, a method is provided for remotely managing a plurality of network element of a telecommunications network through a special communication link including a computer internet such as a local area network, the world wide web or the Internet. A management computer is connected to an element management system server through a communication link including the computer internet. At least one of the plurality of network elements is also coupled to the element management server through the computer internet and the at least one of the plurality of network elements is managed via communications conveyed through the element management server between the management computer and the at least one network element.

28 Claims, 23 Drawing Sheets

| TERM | DEFINITION |
| --- | --- |
| MANAGED OBJECT | AN ABSTRACT REPRESENTATION OF A RESOURCE THAT MAY BE MANAGED BY THE NETWORK MANAGEMENT PLATFORM. EXAMPLES INCLUE A NETWORK ELEMENT, A MAINTENANCE UNIT, NETWORK ELEMENT SUMMARY, DATALINK. |
| CLIENT CALLBACK FUNCTION | A FUNCTION PASSED BY THE CLIENT TO THE SERVER THAT IS USED BY THE SERVER TO DELIVER ASYNCHRONOUS NOTIFICATIONS OF ATTRIBUTE CHANGES, CONFIGURATION CHANGES OR EVENT NOTIFICATIONS. |
| CALLBACK OBJECT REFERENCE | A REFERENCE IN THE EMS SSERVER TO THE CALLBACK OBJECT WITHIN THE CLIENT. THE REFERENCE IS USED BY THE SERVER TO INVOKE THE METHOD WITHIN THE CALLBACK OBJECT TO DELIVER A NOTIFICATION. |
| MANAGED OBJECT CLASS | A NAMED SET OF MANAGED OBJECTS THAT SHARE THE SAME SETS OF ATTRIBUTES, NOTIFICATIONS AND MANAGEMENT OPERATIONS. AN EXAMPLE IS THE AP MANAGED OBJECT CLASS. |
| MANAGED OBJECT CLASS CODE | A CODE THAT IDENTIFIES A SPECIFIC MANAGED OBJECT CLASS (UNIQUE TO THE SYSTEM). THIS CODE IS A CONSTANT (ENUMERATION OR INTEGER DEFINITION. |
| INSTANCE IDENTIFIER | AN INTEGER VALUE THAT IDENTIFIES A SPECIFIC INSTANCE OF A MANAGED OBJECT AND IS UNIQUE WITHIN ITS MANAGED OBJECT CLASS. |
| MANAGED OBJECT IDENTIFIER | THE COMBINATION OF MANAGED OBJECT CLASS CODE AND INSTANCE IDENTIFIER DEFINES THE MANAGED OBJECT IDENTIFIER. ALSO ABBREVIATED AS AN MOID. |
| SERVICE OBJECT | THE OBJECT THAT PROVIDES SERVICES FOR A MANAGED OBJECT CLASS. CLIENT APPLICATIONS ACQUIRE A REFERENCE TO THIS OBJECT (IN CORBA THEY BIND TO THE OBJECT). AN EXAMPLE IS THE AP SERVICE OBJECT AND THE USER SESSION SERVICE OBJECT. |
| ATTRIBUTE | A PROPERTY OF A MANAGED OBJECT. AN ATTRIBUTE HAS A VALUE. |
| ATTRIBUTE CODE | A CODE THAT IDENTIFIES A SPECIFIC ATTRIBUTE OF A MANAGED OBJECT CLASS. |
| METHOD OR OPERATION | AN OPERATION OR METHOD ON A MANAGED OBJECT PERFORMS AN ACTION. |
| NOTIFICATION | INFORMATION EMITTED BY A MANAGED OBJECT RELATING TO AN EVENT THAT HAS OCCURRED WITHIN THE MANAGED OBJECT. AN EXAMPLE IS AN ATTRIBUTE CHANGE NOTIFICATION. |
| INHERITANCE | THE CONCEPTUAL MECHANISM BY WHICH ATTRIBUTES, NOTIFICATIONS, OPERATIONS, AND BEHAVIOR ARE ACQUIRED BY A SUBCLASS FROM ITS SUPERCLASS. |
| USER SESSION | EACH CLIENT MUST ESTABLISH A UNIQUE SESSION THAT IS USED TO VALIDATE ACCESS PERMISSIONS AND FOR SUBSEQUENT ROUTING OF NOTIFICATIONS. |
| MARSHALING | ENCODING AND DECODING AN OPERATION AND ITS PARAMETERS INTO FLATTENED MESSAGE FORMATS. |
| CONTAINMENT | A STRUCTURING RELATIONSHIP FOR MANAGED OBJECT INSTANCES IN WHICH THE EXISTENCE OF A MANAGED OBJECT INSTANCE IS DEPENDENT ON THE EXISTENCE OF A CONTAINING MANAGED OBJECT INSTANCE. AN EXAMPLE IS THE RCS OBJECT CONTAINED WITHIN THE AP OBJECT. |

FIG. 6

TABLE 1 - EMAPI SERVER INTERFACE

| | |
|---|---|
| USER SESSIONS MANAGER (UserSession) | IN ITS CURRENT FORM, THE PRIMARY FUNCTION OF THE USER SESSION MANAGER IS TO MAINTAIN A LIST OF ACTIVE CLIENT SESSIONS AND APPLICATIONS. IN SUBSEQUENT RELEASES, THIS SERVICE OBJECT WILL PROVIDE USER ACCESS SECURITY ON A NETWORK-ELEMENT AND OPERATION BASIS. REFER TO THE SECTION ON SESSION MANAGEMENT FOR A DISCUSSION OF THE INTERFACES PROVIDED BY UserSession. |
| MANAGED OBJECT (MO) | FOR EACH PHYSICAL OR LOGICAL RESOURCE WHICH MUST BE MANAGED BY THE EMS, AN ABSTRACT REPRESENTATION WILL BE DEFINED WHICH IDENTIFIES ATTRIBUTES AND OPERATIONS ASSOCIATED WITH THE RESOURCE. EACH APPLICATION-SPECIFIC MANAGED OBJECT IMPLEMENTED ON THE SERVER MUST PROVIDE THE SAME CLIENT INTERFACES FOR RETRIEVING CONFIGURATION INFORMATION, ATTRIBUTE VALUES, AND REGISTRATION FOR NOTIFICATION OF CHANGES. REFER TO THE SECTION ON MANAGED OBJECTS FOR FURTHER DETAILS. |
| NETWORK-ELEMENT LEVEL MANAGED OBJECT (NEMO) | EACH APPLICATION-SPECIFIC NEMO IMPLEMENTED ON THE SERVER MUST PROVIDE ADDITIONAL INTERFACES ABOVE THOSE PROVIDED BY THE STANDARD MANAGED OBJECT TO SUPPORT NETWORK-ELEMENT LEVEL CONFIGURATION QUERIES. REFER TO THE SECTION ON NETWORK ELEMENT LEVEL MANAGED OBJECTS FOR FURTHER DETAILS. |
| EVENT DISTRIBUTOR (EvtDist) | THE EVENT DISTRIBUTOR PROPAGATES EVENTS EITHER RECEIVED OR GENERATED AT THE SERVER TO CLIENTS WHICH REGISTER FILTERS SPECIFYING EVENT FILTER CRITERIA. REFER TO THE SECTION ON THE EVENT DISTRIBUTOR FOR THE DEFINITION OF AN EVENT AND EVENT FILTER, AND A DISCUSSION OF THE CLIENT INTERFACES PROVIDED BY EvtDist. |
| ALARM MANAGER (AlarmManager) | THE AlarmManager IMPLEMENTS INTERFACES FOR A SINGLE CLIENT APPLCIATION CALLED THE AlarmList. (NOTE THAT THERE MAY BE MORE THAN ONE INSTANCE OF THE AlarmList APPLICATION ACTIVE AT ANY ONE TIME). ALARM FILTERS MAY BE REGISTERED WHICH FILTER ALARM INFORMATION BASED ON NETWORK ELEMENT, MANAGED OBJECT OR ALARM LEVEL. THE AlarmManager RETURNS AN INITIAL VIEW OF ALL ACTIVE ALARMS MATCHING THE SPECIFIED CRITERIA, AND PROVIDES NOTIFICATION OF CHANGES RESULTING FROM SUBSEQUENT ALARM SET OR CLEAR EVENTS. REFER TO THE SECTION ON THE ALARM MANAGER FOR THE DEFINITION OF AN ALARM AND ALARM FILTER, AND A DETAILED DISCUSSION OF THE CLIENT INTERFACES PROVIDED BY THE AlarmManager. |

FIG. 16

TABLE 2 - EMAPI CLIENT INTERFACE

| | |
|---|---|
| USER SESSIONS MANAGER (UserSession) | IN ITS CURRENT FORM, THE PRIMARY FUNCTION OF THE USER SESSION MANAGER IS TO MAINTAIN A LIST OF ACTIVE CLIENT SESSIONS AND APPLICATIONS. IN SUBSEQUENT RELEASES, THIS SERVICE OBJECT WILL PROVIDE USER ACCESS SECURITY ON A NETWORK-ELEMENT AND OPERATION BASIS. REFER TO THE SECTION ON SESSION MANAGEMENT FOR A DISCUSSION OF THE INTERFACES PROVIDED BY UserSession. |
| MANAGED OBJECT (MO) | FOR EACH PHYSICAL OR LOGICAL RESOURCE WHICH MUST BE MANAGED BY THE EMS, AN ABSTRACT REPRESENTATION WILL BE DEFINED WHICH IDENTIFIES ATTRIBUTES AND OPERATIONS ASSOCIATED WITH THE RESOURCE. EACH APPLICATION-SPECIFIC MANAGED OBJECT IMPLEMENTED ON THE SERVER MUST PROVIDE THE SAME CLIENT INTERFACES FOR RETRIEVING CONFIGURATION INFORMATION, ATTRIBUTE VALUES, AND REGISTRATION FOR NOTIFICATION OF CHANGES. REFER TO THE SECTION ON MANAGED OBJECTS FOR FURTHER DETAILS. |
| NETWORK-ELEMENT LEVEL MANAGED OBJECT (NEMO) | EACH APPLICATION-SPECIFIC NEMO IMPLEMENTED ON THE SERVER MUST PROVIDE ADDITIONAL INTERFACES ABOVE THOSE PROVIDED BY THE STANDARD MANAGED OBJECT TO SUPPORT NETWORK-ELEMENT LEVEL CONFIGURATION QUERIES. REFER TO THE SECTION ON NETWORK ELEMENT LEVEL MANAGED OBJECTS FOR FURTHER DETAILS. |
| EVENT DISTRIBUTOR (EvtDist) | THE EVENT DISTRIBUTOR PROPAGATES EVENTS EITHER RECEIVED OR GENERATED AT THE SERVER TO CLIENTS WHICH REGISTER FILTERS SPECIFYING EVENT FILTER CRITERIA. REFER TO THE SECTION ON THE EVENT DISTRIBUTOR FOR THE DEFINITION OF AN EVENT AND EVENT FILTER, AND A DISCUSSION OF THE CLIENT INTERFACES PROVIDED BY EvtDist. |
| ALARM MANAGER (AlarmManager) | THE AlarmManager IMPLEMENTS INTERFACES FOR A SINGLE CLIENT APPLCIATION CALLED THE AlarmList. (NOTE THAT THERE MAY BE MORE THAN ONE INSTANCE OF THE AlarmList APPLICATION ACTIVE AT ANY ONE TIME). ALARM FILTERS MAY BE REGISTERED WHICH FILTER ALARM INFORMATION BASED ON NETWORK ELEMENT, MANAGED OBJECT OR ALARM LEVEL. THE AlarmManager RETURNS AN INITIAL VIEW OF ALL ACTIVE ALARMS MATCHING THE SPECIFIED CRITERIA, AND PROVIDES NOTIFICATION OF CHANGES RESULTING FROM SUBSEQUENT ALARM SET OR CLEAR EVENTS. REFER TO THE SECTION ON THE ALARM MANAGER FOR THE DEFINITION OF AN ALARM AND ALARM FILTER, AND A DETAILED DISCUSSION OF THE CLIENT INTERFACES PROVIDED BY THE AlarmManager. |

FIG. 17

| ASN.1 PRIMITIVE AND APPLICATION TYPES SUPPORTED BY SNMPv2 | | |
|---|---|---|
| EMAPI TYPE | ASN.1 TAG OR RFC1155 TYPE | IDL REPRESENTATION |
| ASN1BOOLEAN | BOOLEAN | BOOLEAN |
| ASN1INTEGER | INTEGER | LONG |
| ASN1UINTEGER | *NOT A TRUE ASN.1 TYPE | UNSIGNED LONG |
| ASN1OCTET | OCTET STRING | SEQUENCE<OCTET> |
| ASN1TIMETICKS | TIMETICKS | UNSIGNED LONG |
| ASN1GAUGE | GAUGE | UNSIGNED LONG |
| ASN1COUNTER | COUNTER | UNSIGNED LONG |
| ASN1IPADDRESS | IPADDRESS | OCTET(4) |
| ASN1NULL | NULL | OCTET |
| ASN1OID | OBJECT IDENTIFIER | SEQUENCE<UNSIGNED LONG> |

| EMS-SPECIFIC TYPES | | |
|---|---|---|
| EMAPI TYPE | DESCRIPTION | IDL REPRESENTATION |
| LOGICALID | NETWORK ELEMENT OR MAINTENANCE UNIT LOGICAL IDENTIFIER | ASN1INTEGER |
| CLASSCODE | INTEGER VALUE WHICH UNIQUELY IDENTIFIES MANAGED OBJECT CLASS | LONG |
| INSTID | INTEGER VALUE WHICH UNIQUELY IDENTIFIES AN INSTANCE OF A GIVEN MANAGED OBJECT | UNSIGNED LONG |
| ATTRCODE | INTEGER VALUE WHICH UNIQUELY IDENTIFIES AN ATTRIBUTE OF A GIVEN MANAGED OBJECT | LONG |
| CMDSEQNO | COMMAND SEQUENCE NUMBER | LONG |

FIG. 18

TABLE 3 - VALID FILTER CRITERIA PER EVENT CATEGORY

| EVENT CATEGORY | VALID CRITERIA | | | | |
|---|---|---|---|---|---|
| | NETWORK ELEMENT ID | NETWORK ELEMENT ALARM LEVEL | MAINTENANCE UNIT ID | MAINTENANCE UNIT ALARM LEVEL | COMMAND ID |
| ALARM CLEAR | X | X | X | X | |
| ALARM SET | X | X | X | X | |
| COMMAND ACKNOWLEDGMENT | X | | | | X |
| COMMAND RESPONSE | X | | | | X |
| CONFIGURATION CHANGE | X | | X | | |
| INFOMRATIONAL MESSAGE | X | | X | | |
| INITIALIZATION | X | | X | | |
| STATE CHANGE | X | X | | | |
| ANY CATEGORY | X | X | X | X | X |

| MNEMONIC | MEANING |
|---|---|
| EM_INVALID_USER | THE USER LOGIN IDENTIFIER IS INVALID |
| EM_UNKNOWN_HOST | THE SPECIFIED HOST IS UNKNOWN |
| EM_TOO_MANY_SESSIONS | TOO MANY CLIENT SESSIONS ARE ALREADY ACTIVE FOR THE SPECIFIED LOGIN |
| EM_TOO_MANY_SYSTEM_SESSIONS | TOO MANY CLIENT SESSIONS ARE ACTIVE |
| EM_TOO_MANY_APPLICATIONS | TOO MANY CLIENT APPLICATIONS ARE ACTIVE FOR THE SPECIFIED SESSION ID |
| EM_INVALID_SESSION_ID | THE SPECIFIED CLIENT SESSION ID IS INVALID OR NO LONGER KNOWN |
| EM_INVALID_APP_ID | THE SPECIFIED CLIENT APPLICATION ID IS INVALID OR NO LONGER KNOWN |
| EM_INVALID_NE_ID | THE SPECIFIED NETWORK ELEMENT INSTANCE IS IS INVALID OR NO LONGER KNOWN |
| EM_INVALID_MO_ID | THE SPECIFIED MANAGED OBJECT INSTANCE ID IS INVALID OR NO LONGER KNOWN |
| EM_INVALID_ATTR_CODE | THE SPECIFIED MANAGED OBJECT ATTRIBUTE CODE IS INVALID |
| EM_NO_MATCHING_INST | NO MANAGED OBJECT INSTANCE CONTAINS A MATCHING KEY LIST |
| EM_INVALID_FILTER | THE SPECIFIED FILTER FOR EITHER AN EVENT OR ALARM CONTAINED ONE OR MORE INVALID CRITERIA |
| EM_INVALID_FILTER_ID | THE SPECIFIED FILTER ID FOR EITHER AN EVENT OR ALARM IS INVALID |
| EM_NE_ISOLATED | THE SPECIFIED NETWORK ELEMETN INSTANCE IS ISOLATED |
| EM_INTERNAL_ERROR | THE REQUEST COULD NOT BE SATISFIED BECAUSE OF AN EMS SERVER ERROR |

METHOD FOR COMPUTER INTERNET REMOTE MANAGEMENT OF A TELECOMMUNICATION NETWORK ELEMENT

BACKGROUND OF THE INVENTION

This invention generally relates to a telecommunication network and more particularly to managing network elements of the telecommunications network.

Network management systems in which a management computer, or work station, runs a management computer program, or management application, to manage a set of management agent computer programs, or management agents, associated with a corresponding set of network elements are known. Such known management systems employ a communication protocol that employs a management information base for each network that defines the interface between the management application and the network element. These management systems are implemented only at the individual network elements and have not been successfully employed for large scale management of a telecommunications network.

SUMMARY OF THE INVENTION

In accordance with the invention, a method is provided for remotely managing a network element of a telecommunications network through a special communication link including a computer internet. A management computer is connected to an element management system server through a communication link including a computer internet. At least one of the plurality of network elements is also coupled to the element management server through the computer internet and the at least one of the plurality of network elements is managed via communications conveyed through the element management server between the management computer and the at least one network element.

Preferably, management is facilitated by the management server generating an interactive web page at a client workstation with objects associated with management of the at least one network element. The interactive web page is transmitting from the management server through the computer internet to the management computer and displayed at the interactive web page at the management computer for management communications between the management computer and the network element. Objects of the interactive web page include objects associated with preferably all three of operation, administration and maintenance of the network element.

In an embodiment, the interactive web page includes a detailed status summary page for each network element of the telecommunications network, a relatively high system status summary of all the plurality of network elements and a list of all active alarms within the telecommunications network.

The plurality of network elements each have an associated applications processor with a management agent application for interfacing the element management server with the network element. The application processor includes a maintenance application for performing maintenance of the network element command request are interfaced from the element management server through the management agent application to the maintenance application to selectively perform maintenance tasks. The element management server is provided with application processor specific events and command acknowledgments.

Preferably, the computer internet is the world wide web, or Internet, connections and communications are achieved through operating world wide web based JAVA applications at the management computer and the element management server. Alternatively, the computer internet is a local area network. In this way, multiple management computers at different remote locations are capable of accessing any and all of the network elements of the telecommunications network. Multiple commands simultaneously received from a plurality of different management computers are queued and the multiple commands are responded to by sending responses to only the appropriate ones of the different management computers that originated the corresponding commands. Connection of the management computers to the special element management server is preferably enabled only in response to entry of a correct password at the management computer. Preferably, the password is encrypted prior to being sent to the element management server.

Thus, the invention also includes the concept of managing all of the plurality of network elements from a plurality of different remote management computers by performing the steps of selectively running a management application at a plurality of different work station for command, control and fault management of the network elements, interfacing an element management server through a computer internet to the plurality of different work stations to provide distributed network element management services to the management application at all of the plurality of work stations, and interfacing the network element with the element management server through a management agent application associated with the network element for communicating command acknowledgment and command requests through the computer internet between the network management server and the network element.

Thus, a method is provided which overcomes the deficiencies of known network element management systems and methods that provides distributed network management for enhanced efficiency and convenience which has the features needed for large scale management of a telecommunications system.

Appendix A provides a definition of terms and a glossary of acronyms included in this application.

BRIEF DESCRIPTION OF THE DRAWINGS

The forgoing advantageous features will be made apparent and other features of the invention will be described in the detailed description of the preferred embodiment that is given with reference to the several figures of the drawing, in which:

FIG. 6 is a table of terms associated with the managed object model in accordance with the invention;

FIG. 16 shows the service objects resident on the server with which client applications interact;

FIG. 17 shows the callback interfaces defined in the EMAPI;

FIG. 18 shows data types defined in the EMAPI;

FIG. 20 shows filter criteria which are valid for each event category; and

FIG. 21 shows an EMAPI specific exception defined with an EMAPI exception code containing one of a plurality of values.

DETAILED DESCRIPTION

Figure 1A:
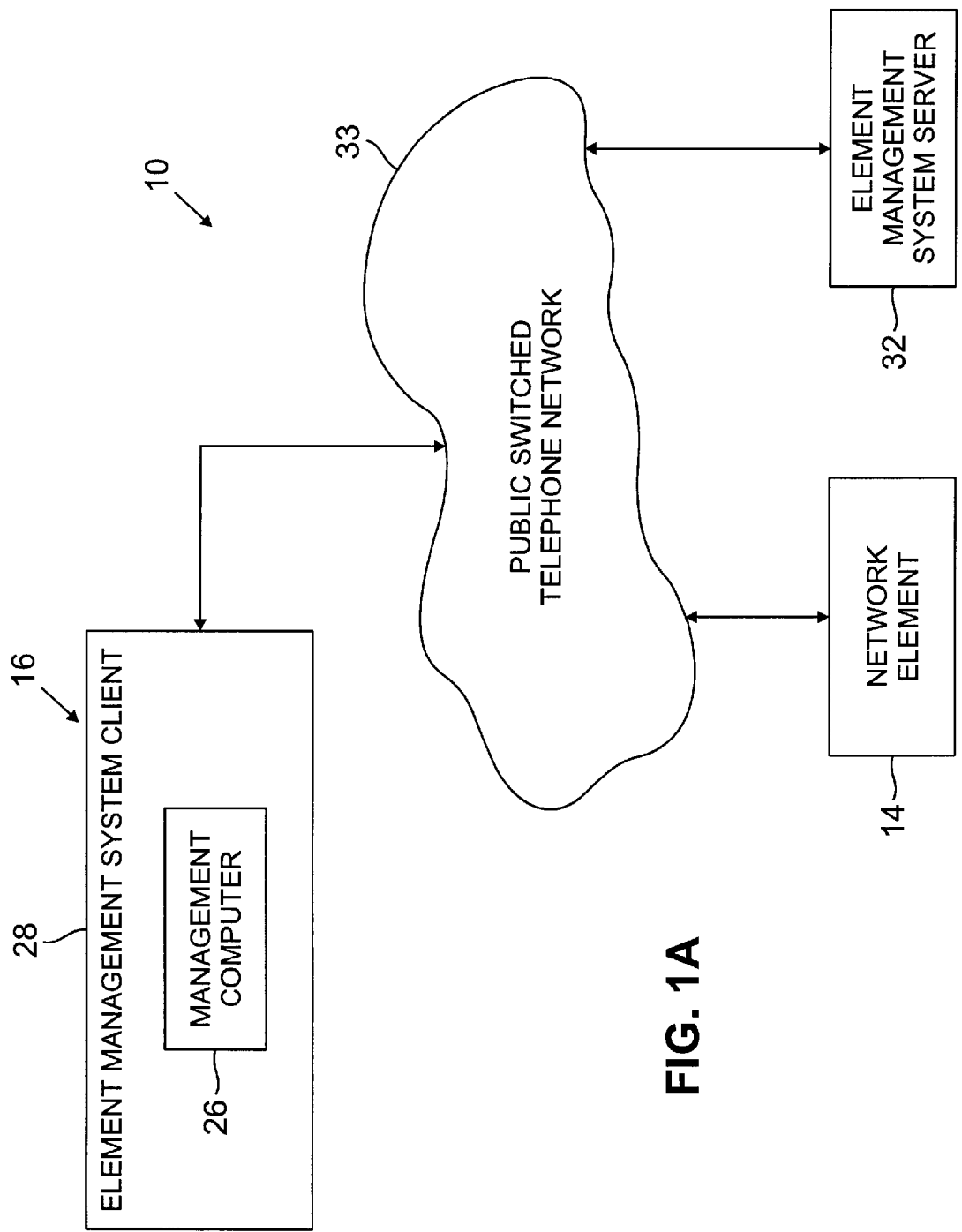
FIG. 1A is a functional block diagram of an embodiment of the network element management system in which the management computer, or work station, is employed to control, or manage, a plurality of network elements of a telecommunication network through a public switched telephone network (PSTN)

FIG. 1A illustrates a system 10 in which the method of managing a network element 14 at a web enabled workstation 16 is shown. A management computer 26 associated with an element management system client 28 is connected to a network element 14 and element management system client 32 through a public switched telephone network (PSTN) 33.

Figure 1B:
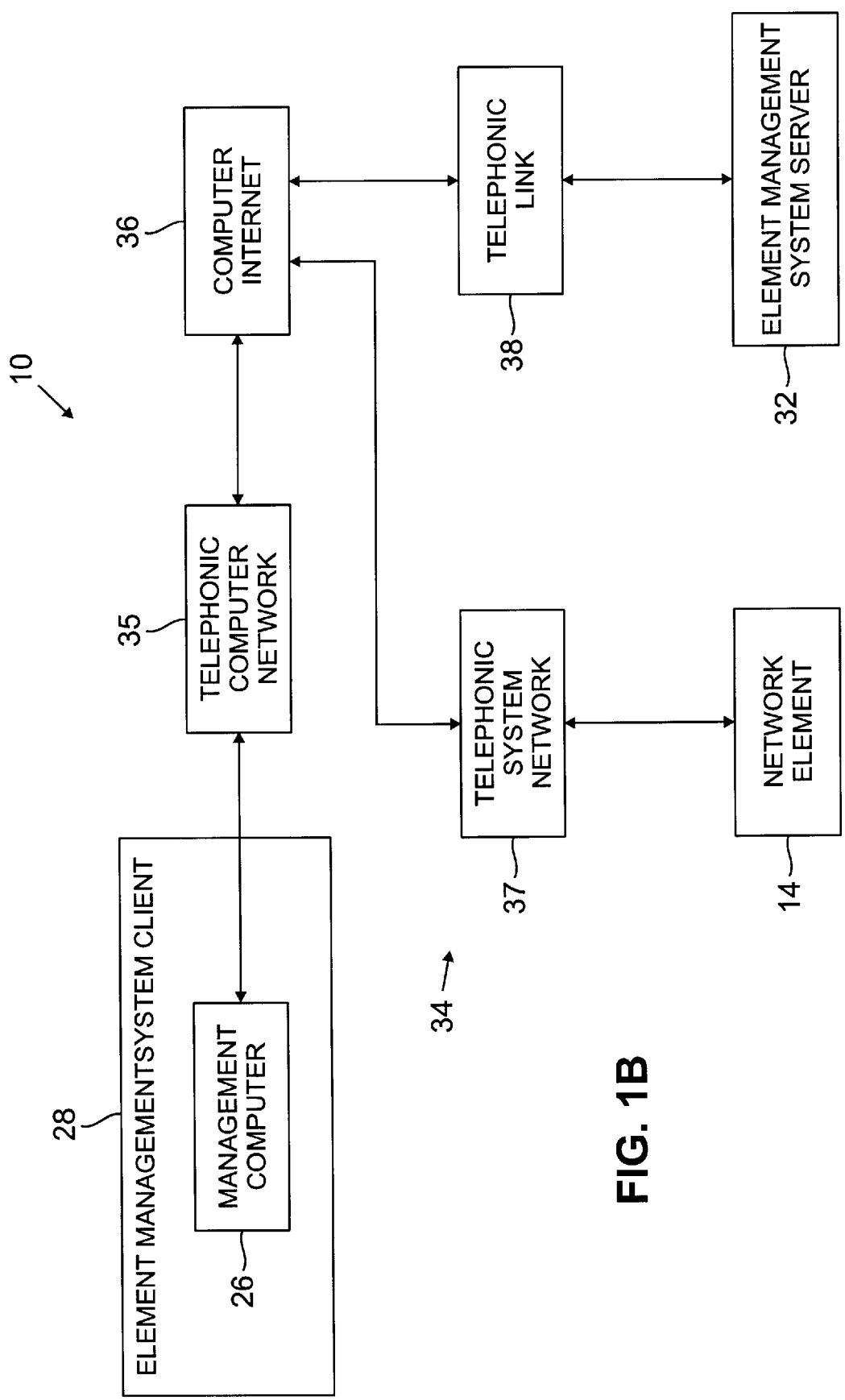
FIG. 1B is a functional block diagram of an embodiment of the network element management system in which the management computer, a work station, is employed to control, or manage, a plurality of network elements of a telecommunications network through a computer internet.

FIG. 1B illustrates a system 34 in which the method of managing the network element 14 in a telephonic network at web enabled workstation 16 is shown. Network element 14 is connected through a telephonic computer network 35 to a computer internet 36. The management computer 26 associated with the element management system client 28 is connected to the element system management system sever 32 over a telephonic system network 34 through the computer internet 35 and a telephonic link 38.

Figure 1C:
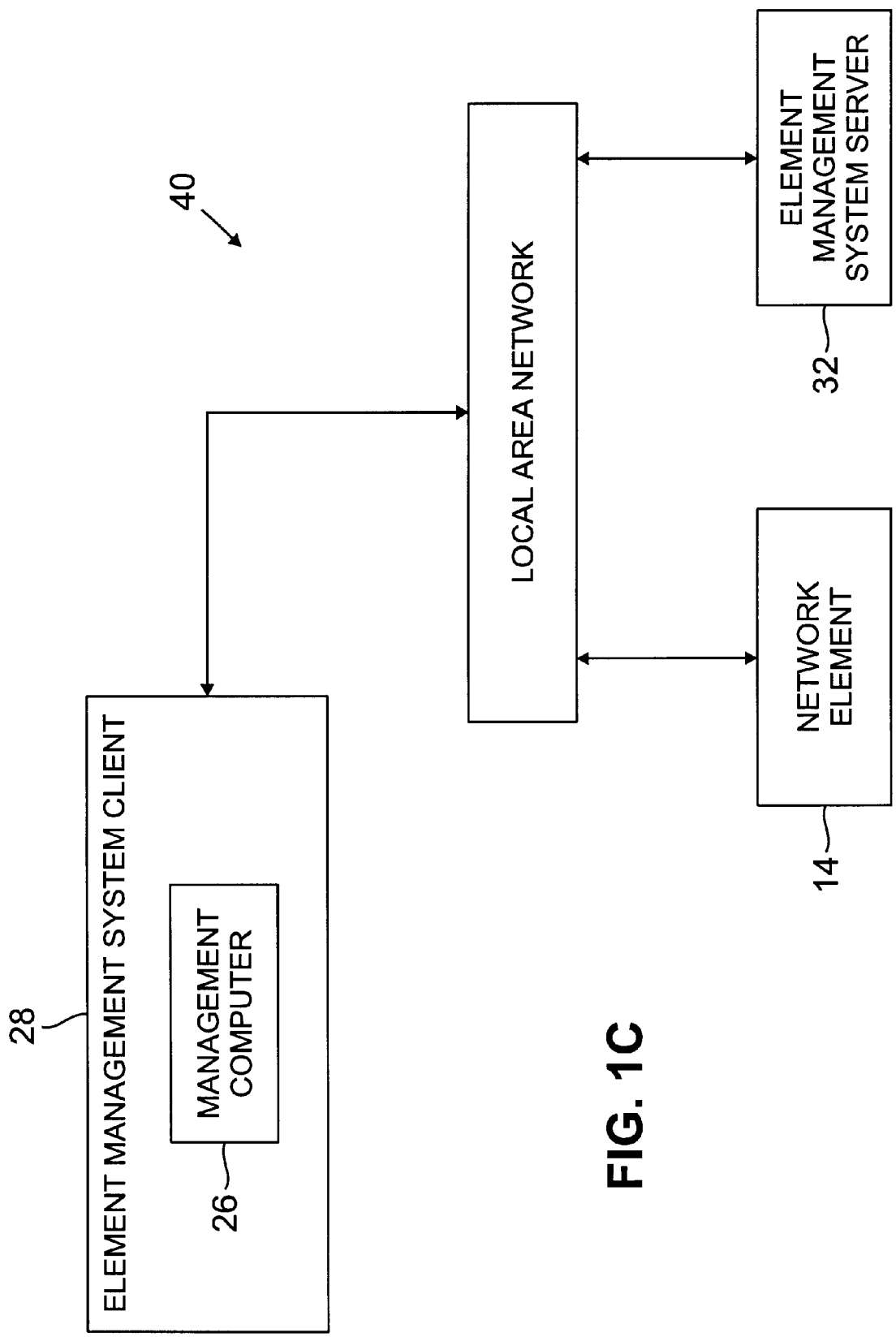
FIG. 1C is a functional block diagram of an embodiment of the network element management system in which the management computer, or work station, is employed to control, or manage, a plurality of network elements of a telecommunication network through a local area network.

FIG. 1C illustrates a system 40 in which the managing of the network element 14 is performed from the management computer 26 with the associated element management system client 28 with the element management system 32 via a local area network 42.

The method in accordance with a the invention enables the leveraging of off-the-shelf technology to enable additional client visible features, while extending to subsequent releases and other projects, with little to no increase to cost of goods.

Figure 2:
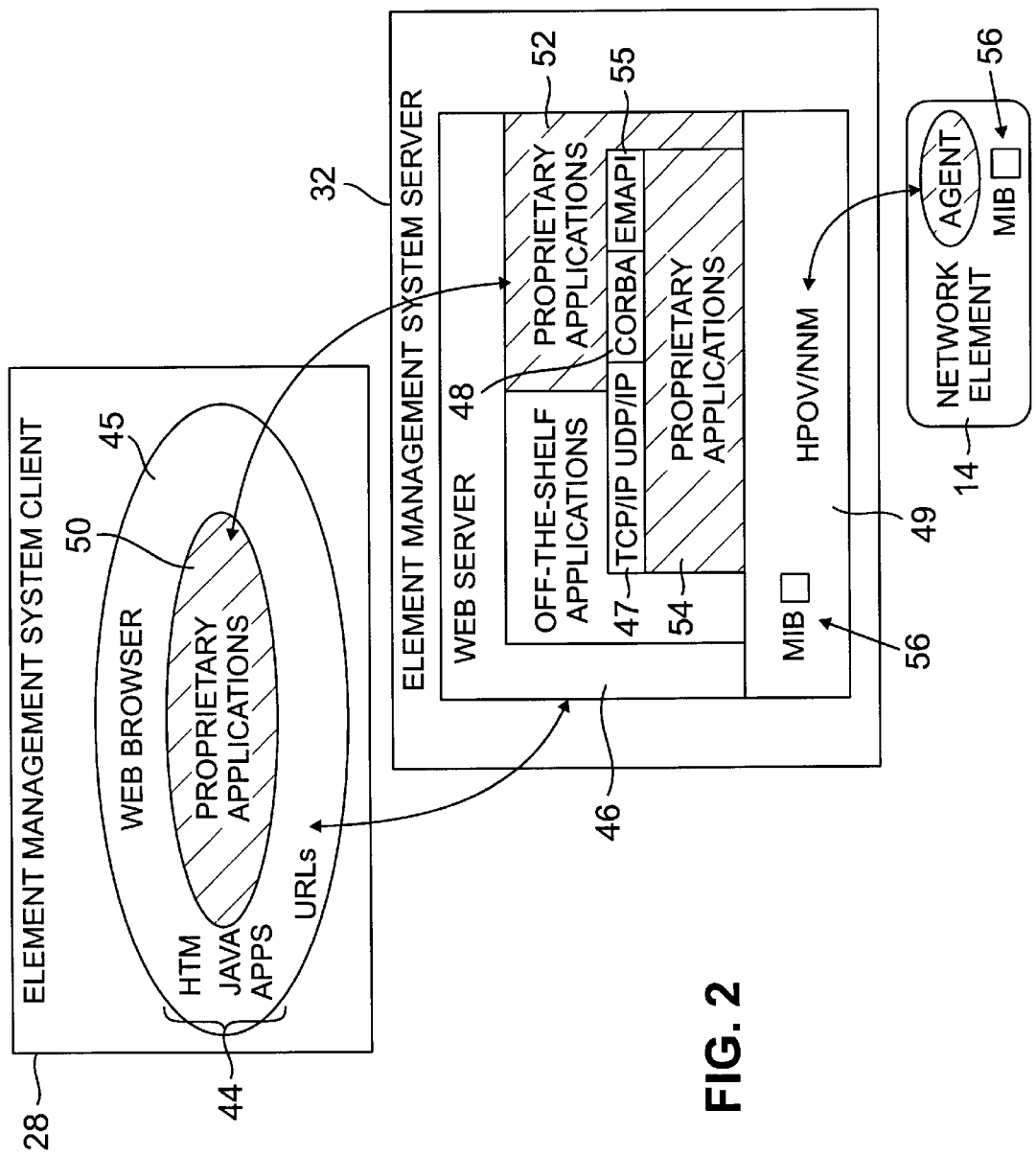
FIG. 2 is a functional block diagram of an element management system in which the management of a network element is accomplished at a web enabled workstation with off-the-shelf components and proprietary applications.

Referring to FIG. 2, the network element 14 is provided through the element management system client 28 and a SNMP-based element management platform. The method in accordance with the invention works with off-the-shelf components 44, 45, 46, 47, 48 and 49 and propriety applications 50, 52, 54, 55 and 56. The off-the-shelf technologies include: the HTML and Java apps 44, the web browser 45, the web server 46, Transport Protocols [TCP/IP UDP/IP] 47, CORBA 48, and the SNMP element management platform (HP OpenView Network Node Manager [HPOVNNM]) 49, alternatively a Carnegie-Mellon University (CMU) SNMP library is used, and the Transport Protocols (TCP/IP protocol suite).

The client executes the Client Interface and propriety applications via Web pages. Microsoft Internet Explorer and netscape browsers are supported as are the web-enabling devices for PCs and X-terminals. Through a Web-based graphical client interface, clients' commands generate HTTP requests to the element management system server. The server gathers information, dynamically generates a Web page, and sends the results/output to the web browser for display.

Client applications (JAVA Applets) include proprietary applications such as, an active alarm list browser, a system alarm summary, and a network element detailed status display. Client applications communicate with the server via an object oriented interface to the element manager API (EMAPI) 55 through the distributed object request architecture (CORBA) 48. This interface provides a consistent interface to all managed objects in the network, and hides the implementation details associated with the element manager platform.

The element management system server 32 executes applications to serve information to clients via CORBA middleware. CORBA will serve as the IPC for functions residing on the server, thereby eliminating any platform-specific IPC from the implementation, and providing for distribution of functionality to multiple processors if needed in the future for performance. Communication between the element management system and the managed elements is via SNMP. System status is obtained through SNMP polling and audits, SNMP traps are used for real-time notifications, and SNMP sets are used for command and control. The element management system has no persistent store over a system boot, and requires a handshake with each network element when the element management system is initialized; however, it does store information for use by multiple clients, so it does not need to get this information for each request from a new client. Command and alarm output is displayed via the Web browser based display, as well as sent to an executive control processor read only printer.

The network element 14 is responsible for processing event and alarm notifications to the element management system via SNMP, and for issuing commands for obtaining information from applications. A management information base (MIB) 56 conventions is defined for managing network elements in the system. The MIB 56 conventions define command execution, message sequencing, and audit provisions, that are used within the element management system architecture but are not provided for in SNMP.

Figure 3:
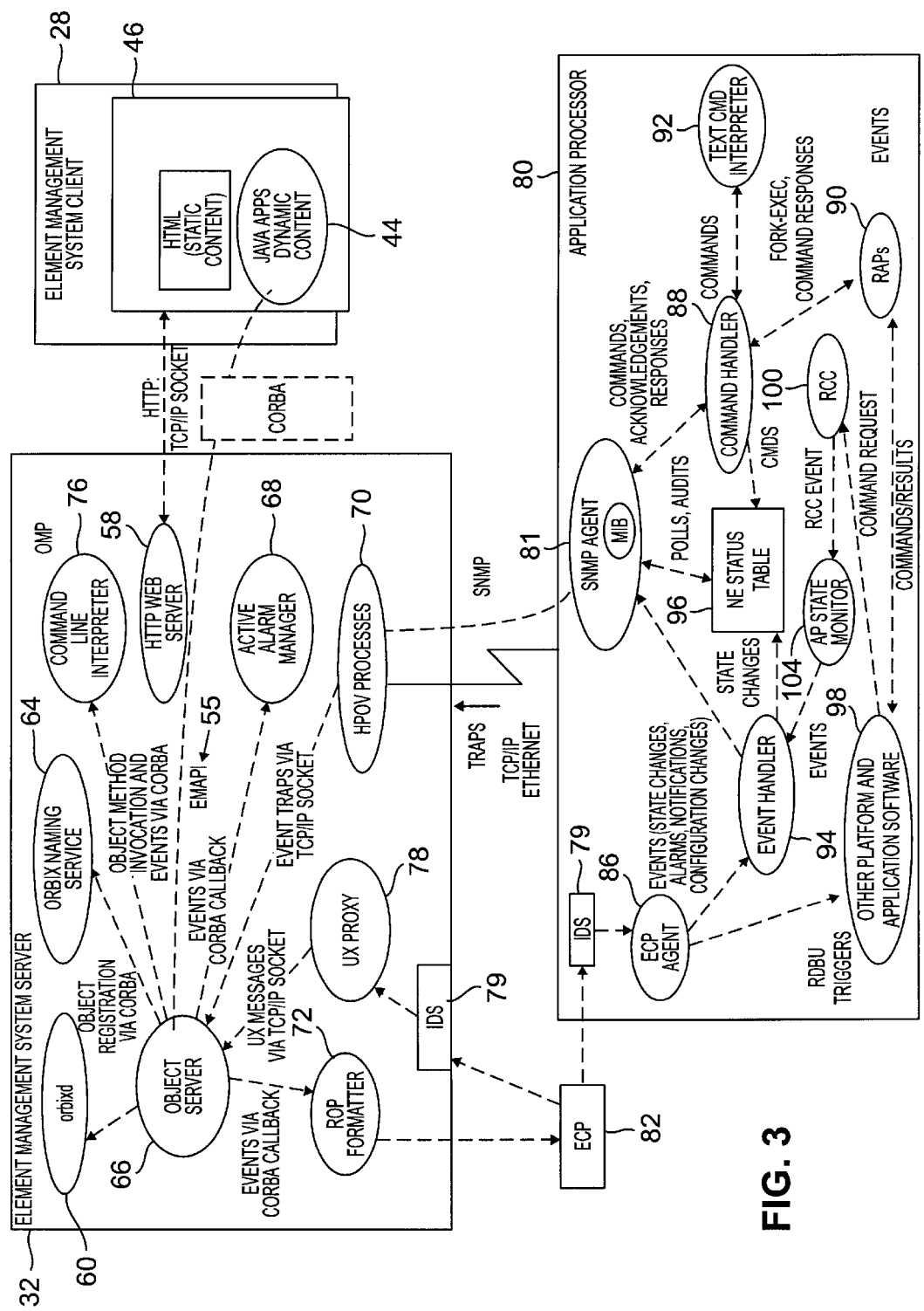
FIG. 3 is a functional block diagram of the major software of the architecture of the invention.

The following is a description of the functional block diagram shown in FIG. 3 of the software components of the invention.

Element Management Server Software Components

The element management system client 28 is the client's interface to the element management system server 32. It consists of the web browser 45 and the JAVA applets 44.

Web Browser: The web browser 45 is the interface to end client, a host for JAVA applets 44, and a virtual machine for JAVA execution. Netscape and MS Explorer are both supported (for platforms that support these browsers).

JAVA Applets: JAVA Applets 44 include but are not limited to the following:

System Summary Application: provides a hierarchical view of alarm status, summary icons for parent nodes, color encoding of alarm states, and point/click navigation to Network Element Detailed Status screens;

Network Element Detailed Status Application: provides a custom view of each network element, displays static configuration data, and maintenance state of all managed objects;

Active Alarm List Browser Application: displays the current list of outstanding alarms in the system.

The major software components of the Element management system server include:

HTTP Web Server 58: processes HTTP requests from the element management system Client that retrieve and download HTML pages and Java applets (from the element management system Server hard disk) associated with the element management system Client application (from the element management system Server hard disk).

Orbixd 60: Iona Orbix daemon, the object request broker

Orbix Naming Service 64: an Orbix process that services object locator requests Object Server 66: a single UNIX process that provides most of the element management system server functionality. It is described in detail in later sections of this document.

Active Alarm Manager 68: provides for client access to alarms currently active in the system and represents the element management system component of the Client Alarm List application.

HPOV processes 70: provide the network management system infrastructure (SNMP API, trapd, postmaster daemon). Alternatively, the network management system is performed by a CMU SNMP library.

ROP Formatter 72: translates binary message codes into ASCII text in accordance to ECP ROP formatting practices. It then directs the formatted ASCII output to the ROP stream.

Command Line Interpreter 76: provides an ASCII command language interface to allow the technician to enter commands at the element management system and observe results.

UX Proxy 78: UX message interface (bridge between System V message queues and sockets) to an internal database subsystem (IDS) 79.

INTERNAL DATABASE SUBSYSTEM (IDS) 79: ECP Ring Database Update triggers the object server (through UX Proxy) when an AP is added to the system.

Application Processor (AP) Components

The following components reside on the AP 80:

SNMP Agent 81: sends and receives messages between the AP and element management system infrastructure. It is also responsible for the throttling traps to prevent overloading the system.

the internal database subsystem (IDS) 79: ECP Ring Database Update downloads AP configuration data and updates from a ECP 82.

ECP Agent 86: processes IDS triggers, notifies AP applications of changes to their configuration data, and send configuration changes (events) to the event handler.

Command Handler 88: Handles AP administration command requests issued from either the GUI based or text based client interfaces. Executes a RAP 90 to complete the administration request. Returns the completion information back to the element management system server. Keeps list of active commands in AP Command Table.

Text Command Interpreter 92: A text based interface for special situations in which the GUI based interface presented by the element management system Server is not available to the client.

Event Handler 94: The Event Handler is responsible for handling both the filtering and forwarding of events (alarms, notifications, state changes, configuration changes) to the element management system. Updates the State and Alarm Tables in NEST.

NE Status Table 96: also known as the NEST, stores maintenance object state and alarm information, as well as the list of active commands.

RAPs 90: The Resource Administration Process is an application processing interface(API) for fork-exec'ing a process and obtaining the results of the process execution Other platform and application software 98: encompasses all the entities involved in command execution that aren't otherwise displayed on the diagram due to the desire not to get into too much detail. This includes the RCC resource monitors and resource daemons that come into play when executing an RCC 100 based element management system command (e.g., remove DS1 digital switch), as well as the software application specific to a given resource (e.g., RCS, MMA, CCM, SS7).

RCC 100: as shown it is the call to RCC 100 APIs to generate RCC events for taking a resource out of service. This bubble only comes into play when RCC-based element management system commands are executed. Since this is only an overview, the case for non-RCC-based element management system commands (e.g., diagnose DS1) is not shown.

AP State Monitor 104: a bridge mapping RCC 100 events into locally understood AP 80 events.

REFERENCES

The following describes the architecture of the element management system server and the distributed client applications.

The following provides reference material that may be useful as background information, the disclosures of which are incorporated by reference.

Object Oriented Technology

Taylor, David A. "Object Oriented Technology: A Managers Guide". Addison-Wesley, 1993. ISBN 0-201-56358-4.

Booch, Grady. "Object Oriented Analysis and Design with Applications". Benjamin/Cummings. 1994. ISBN 0-8053-5340-2

Network Management
- Stallings, William. "SNMP, SNMPv2, and CMIP. The Practical Guide to Network-Management Standards". Addison-Wesley, 1993. ISBN 0-201-63331-0.
- Rose, Marshall T. "The Simple Book—An Introduction To Internet Management" Prentice-Hall. 1994. ISBN 0-13-177254-6.
- "Hewlett-Packard OpenView Network Node Manager 4.1 Technical Evaluation Guide", Hewlett Packard Corporation. April 1996.
- "HP OpenView Using Network Node Manage", Hewlett Packard Corporation. April 1996.
- Carnegie-Mellon SNMP libraries; http://www.net.cmu.edu/projects/SNMP.

Web Technology
- The World Wide Web Consortium Web Site <http://www.w3.org/> Contains references, white papers and RFCs relating to web technology.

CORBA
- Orfali, Robert et. al. "The Essential Distributed Objects Survival Guide". John Wiley and Sons. 1996. ISBN 0471-12993-3.
- Vinoski, Steve. "Distributed Object Computing With CORBA". Hewlett-Packard Company, 1993. (Article published in the July/August 1993 issue of C++ Report magazine.
- The Object Management Group Web Site <http://www.omg.org/>. Contains standards documents, white papers and links to information on CORBA.

Figure 4:
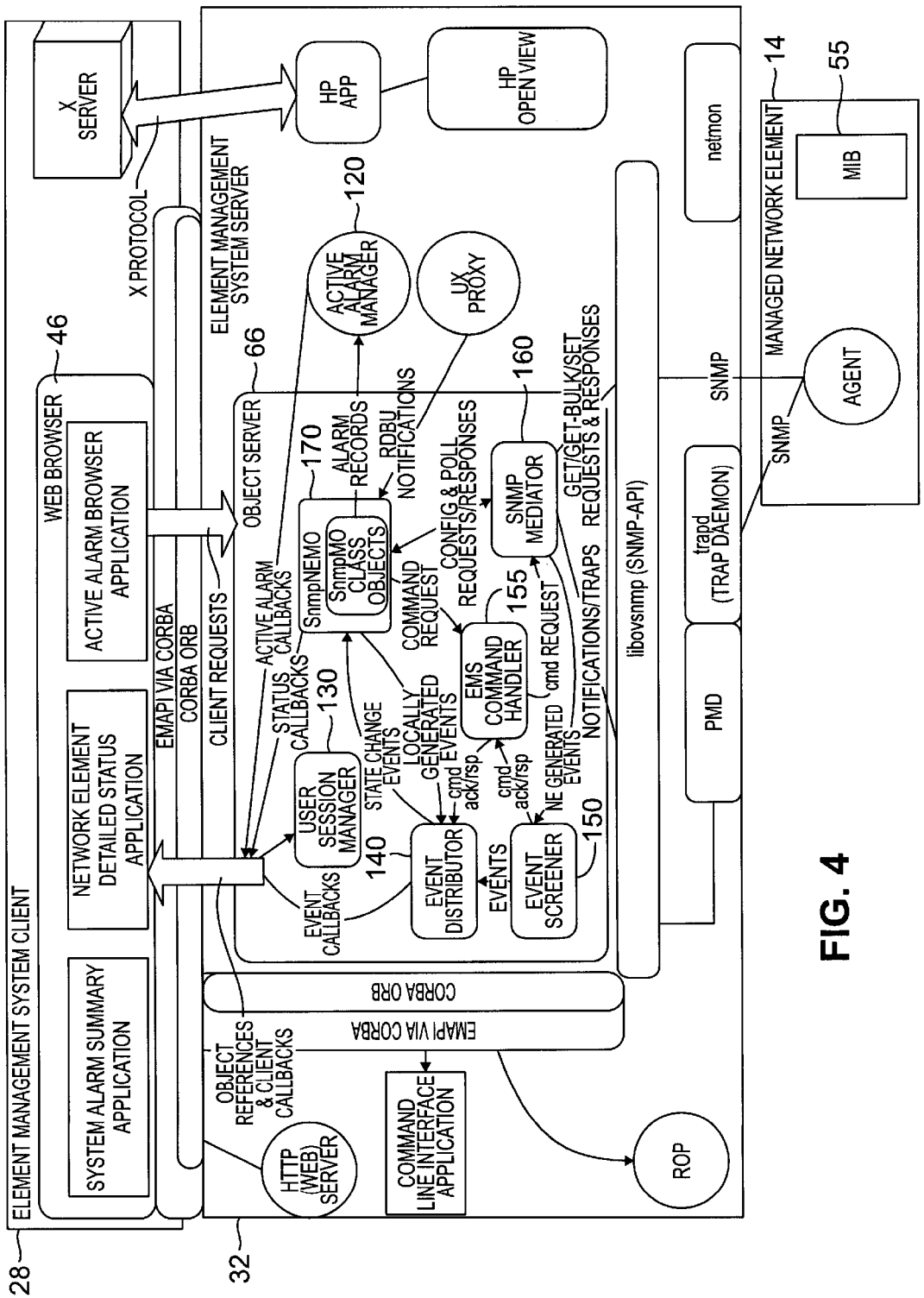
FIG. 4 is a functional block diagram for the element management system server and a client workstation with an associated network element and its associated simple management protocol (SNMP) agent.
Figure 5:
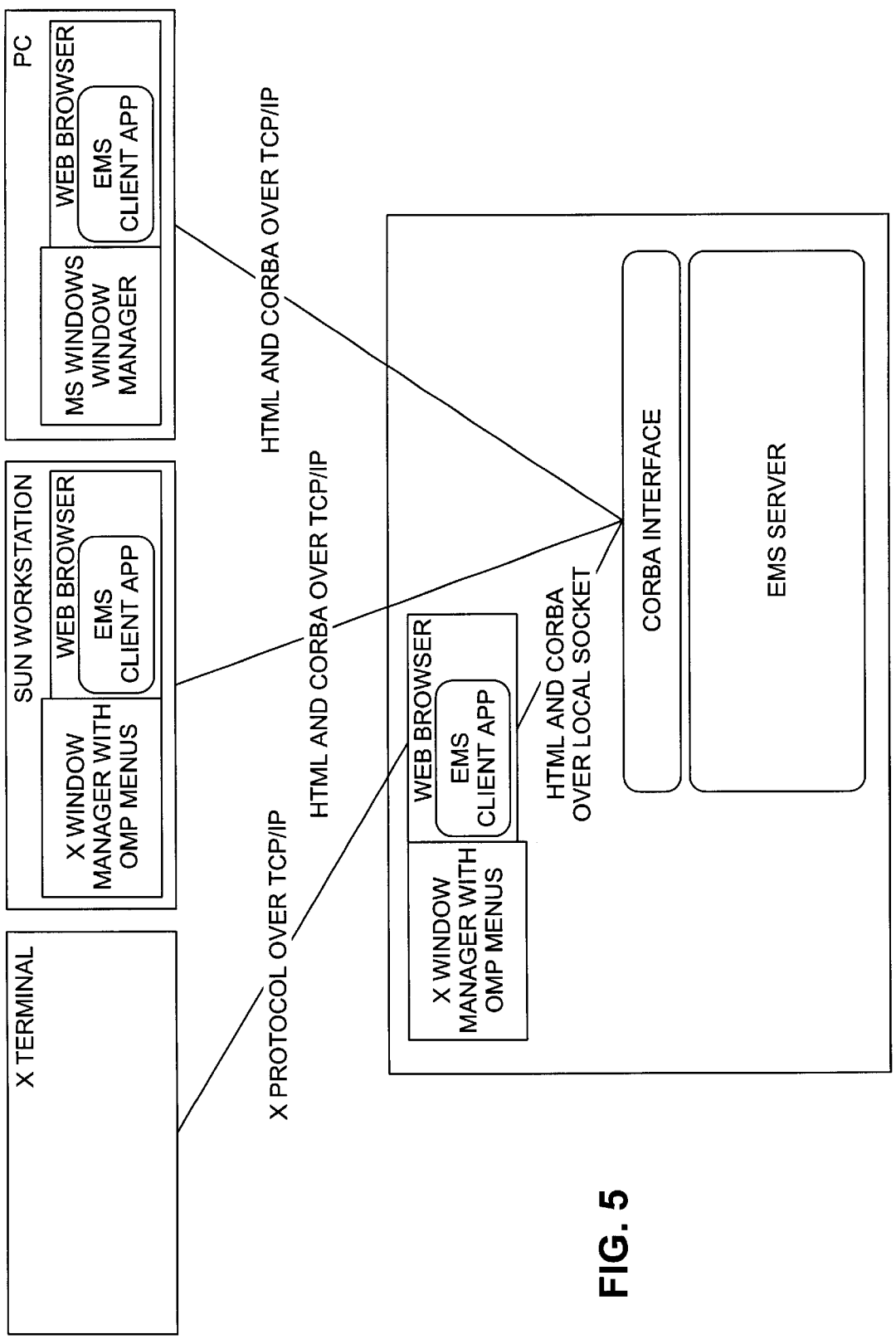
FIG. 5 is a functional block diagram showing element management system client configuration.

FIG. 4 shows a summary of the principle functional components on the element management system server and a single client workstation. A single managed network element 14 is shown with its associated SNMP Agent. A table in FIG. 4 provides a definition of terms used in the subsequent description.

Element Management System Client Components

Element management system client 28 components consist of web browser hosted applications that provide network element command and control and fault management. These web browser hosted applications provide a graphical client interface based client interface in a cross platform environment. The server infrastructure supports applications for performance and security management.

The client interface to the server is described in the EMAPI 55 described in a pending patent application previously incorporated by reference herein. The EMAPI 55 is implemented utilizing an industry standard object management group interface description language (IDL). The interfaces and semantics of the EMAPI 55 enable client application processes to utilize this interface to provide management of the system. Distribution of this interface is achieved through use of the Common Object Request Broker Architecture (CORBA) which provides a distributed object request architecture.

Client applications utilize the EMAPI 55 to access service objects on the server which provide access to attributes of the managed objects, provide maintenance operations for those managed objects, and allow the client to register for notifications of attribute changes and event notifications (which typically will be command acknowledgments and command results).

The development of client applications depends only on the EMAPI 55 interface specification. The use of CORBA allows the clients to be distributed and implemented in a different language (such as Java) than the server (in C++).

The element management system server 32 consists of a set of software components that provide an SNMP network management framework and distributed network management services to client applications. The method in accordance with the invention uses off-the-shelf software components. The off-the-shelf software components included in the element management system are:

(a) HTTP Web Server
 (b) Netscape or Microsoft® Internet Explorer Web Browser
 (c) Orbix Daemon
 (d) Orbix Naming Service
 (e) HP OpenView Network Node Manager (HPOVNNM) or alternatively, a CMU SNMP library package The element management system server 32 software components that are provided by the applicant include:

(a) object server 66
 (b) active alarm manager 120
 (c) unix subsystem proxy
 (d) read only printer formatter
 (e) command line interpreter The first two components, the object server 66 and the active alarm manager 120, provide the bulk of the server functionality required to support the element management system client applications. The other three components serve important supporting roles.

Off the Shelf Element Management System Server Components

HTTP Web Server (Generally called Web Server)

This off the shelf functionality serves static and dynamic web pages to client browsers. The web server must provide support for HTTP 1.0 (or greater), CGI scripts and provide a built in API for the creation of dynamic web pages "on the fly". The Web server supports the following:

CGI script execution.
 Automatic startup from init (no human intervention to start server)
 logging of page access. A log file containing the IP address and the URL referenced. This is used to examine access patterns and detect and trace access from unauthorized sources.
 Web page access control based on client name and password. The server supports basic server authentication, and can be enhanced to support SSL (Secure Socket Layer) if encryption of the browser to server connection is required.
 Secure administrator administration of web server including administration of the client name and password for access control.

Orbix Web Server

Part of the Orbix product. Required to support CORBA within a Web browser. Enables JAVA applets downloaded to the client to communicate via CORBA to the element management system Server.

Orbix Daemon (CORBA ORB)

The CORBA ORB represents the server side of CORBA and is provided by an off-the-shelf CORBA implementation. The Common Object Request Broker Architecture (CORBA) is utilized in this architecture to provide interprocess and inter-processor communication between clients using the EMAPI 55.

CORBA is a platform-independent and language-independent programming and execution environment for distributed objects.

CORBA automates many common network programming tasks:
  object registration
  location and activation
  request multiplexing/de-multiplexing
  framing and error-handling
  parameter marshaling and de-marshaling
  operation dispatching
Access to remote object services is transparent to the caller. Clients do not need to know:
  where the object is located
  its programming language
  its operating system
  any other system aspects that are not part of an object's interface
Orbix Naming Service
The Orbix Naming Service daemon provides symbolic lookup of servers on the network and is necessary to support the IIOP protocol.

HP Open View or Alternatively CMU SNMP Library

Functional Description

The HP OpenView Network Node Manager (HPOVNNM) or CMU SNMP library product provide the lowest-level network management infrastructure for delivery of SNMP SET and GET requests and receipt of SNMP traps. This infrastructure will deliver GET and SET requests from the element management system Server to the SNMP agent and receive traps on the standard trap UDP port and forward them to the SNMP Mediator.

Role of HP OpenView Network Node Manager

When used in the invention, HP OpenView Network Node Manager (HPOVNNM) is used as part of the element management system server 32 infrastructure. While only a subset of the HPOVNNM runtime system will be in active use, the full HPOVNNM system will be installed on the element management system server. The following major components will be installed. Those pieces of HPOVNNM that will be a part of the element management system server infrastructure are shown in bold typeface.

ovspmd (OpenView System Process Management Daemon): This process must be running to enable client-interface status-checking programs such as ovstart to work. Since this monitor does not support restarting terminated system processes, it will not be of particular use in the EM Server process management scheme.
  OVLicenseMgr: the license manager that controls the startup of critical HPOVNNM runtime components and the ovw browser application.
  ovtrapd (OpenView Trap Daemon): Receive incoming SNMP traps from each SNMP agent on a standard port and forward them to the postmaster daemon (see below).
  pmd (Postmaster Daemon): Serves as a general packet router in the HPOVNNM infrastructure. The pmd process receives traps from ovtrapd and forwards them to the element management system Object Server, which has registered to receive all traps.
  ovactiond: the OpenView process that manages the association of traps to UNIX-level actions as defined through the HP OpenView event management software.
  ovtopmd: the OpenView Topology Manager Daemon, which handles IP discovery and layout for the HPOVNNM topology database.
  netmon (Network Monitor): Discovers and monitors nodes on the network. It processes ICMP ping to monitor nodes, and it does simple SNMP periodic polling using the system group of MIB-2.
  snmpCollect: SNMP Collection Daemon which allows clients to define, via the HP OpenView Windows X-based GUI interface, SNMP MIB values that are to be collected periodically. It provides ways to define thresholds and associated actions (UNIX shell commands).
  ovw (OpenView Windows): The OpenView Windows X-based GUI provides access to map applications, an event browser, and a MIB browser.
  ovwdb (OpenView Windows Database): The OpenView Windows topology database manager.

The HPOV SNMP API, a C-language interface to this runtime system, is provided as part of the HPOVNNM Developer's Kit and will be used to:
  Encode and decode SNMP packets.
  Set up and tear down SNMP trap sessions.

The entire platform as described is installed and active is to support $3^{rd}$-party SNMP management applications written specifically for HP OpenView and making use of the ovw map framework. These applications are incorporated with minimal effort, since off-the-shelf $3^{rd}$-party applications use the ovwdb-based managed-object database rather than the CORBA-based Object Server mechanism.

Administration

Some administration of the HPOVNNM infrastructure is required if used instead of a CMU SNMP library package.
  Initial configuration:
    Definition of the local registration files used by HPOVNNM to determine which processes run and to define the specific attributes of each of these processes
    Definition of the trap configuration file: this defines what processing (including just logging) is performed on each trap received by the HPOVNNM infrastructure
    Inclusion of the HPOVNNM ovstart command in the appropriate RCC initialization file for automatic startup of infrastructure
    Configuration of the network license manager used by HPOVNNM
  Ongoing maintenance
    MIB updates
    License updates to the network license manager used by HPOVNNM

Element Management System Server Components in Accordance With the Invention Object Sever The object server provides a way for client applications to receive information about network elements and other associated managed objects and to issue commands that are executed on the network element. To accomplish these functions, the object server provides the following services: (1) client session registration, (2) event distnbution and screening, (3) command management, (4) SNMP mediation, and (5) services specific to each managed object class.

The object server is implemented as a single-threaded process using a central event queue. However, the architecture does not dictate this implementation. The architecture does require that the implementation be platform and operating system neutral, and the concern is that a multi-threaded approach would have operating system dependencies. The sub-components that comprise the object server could be implemented as separate processes. An example of the latter approach is the decision to implement a second major server component, the active alarm manager, as a separate process. As the element management system infrastructure evolves, other components that are currently part of the object server might be implemented as separate processes, if necessary and feasible.

Various forms of inter-process communication may be used to communicate between these components, but the method recommended by this architecture is to use CORBA to remove platform-specific IPC from the implementation, and to provide for distribution of functionality to multiple processors if necessary for performance optimization.

As shown in FIG. 3, the object server consists of the following set of components, each of which supports a particular service:

Client Session Manager 130 maintains a list of active client sessions and audits for sessions that have terminated without notifying the manager.

Event Distributor 140 provides event routing and distribution. Events include SNMP Traps (received via the SNMP Mediator) from network elements, commands, command acknowledgments, command responses, and events generated within the element management system. Clients of the Event distributor register a filter with the Event Distributor to request delivery (via a callback function) of Events matching the filter.

Event Screener 150 is for use by the Object Server only, and supports screening events before they are seen by the event distributor for purposes of open-ended event correlation.

Element Management System Command Handler 155 tracks active commands and releases resources when the commands complete. The element management system Command Handler also coordinates the execution of commands within the element management system.

SNMP Mediator 160 provides translation between the MIB ASN.1 format and the managed object notation used in this architecture. The SNMP Mediator also provides polling services for the SNMP Service Objects, and conversion of managed object commands (e.g. remove, restore) into appropriate SNMP set commands.

Managed Objects: As shown in FIG. 3, each object that represents a network element or maintenance unit in a network element utilizing SNMP for its protocol (e.g. AP, DS1, EIN, LAN) is represented as a "SnmpMO" class object 170. A single instance of an object is used for all instances of that objects class in the system. For example, the AP service object provides attributes and methods for all instances of AP processors in the system. In addition to SnmpMOs, the architecture supports "Logical managed objects" that represent managed objects that aren't directly tied to a network element or maintenance unit. An example would be a "System" managed object class that would provide system level status and commands.

Active Alarm Manager

The active alarm manager 120 provides for client access to alarms currently active in the system and represents the element management system component of the client alarm list application. There are two communicating entities: the AP Active Alarm Table (AAT) managed object (of class ApActiveAlarms) residing in the Object Server; and the Active Alarm Manager (AAM), a separate UNIX system process on the element management system that provides access (as defined by class AlarmManager) to client applications. The AAM is implemented as a separate system process on the element management system to avoid blocking the execution of the object server when potentially large volumes of alarm data must be delivered by the AAM (e.g., at client application startup. Since the AAT and AAM communicate across process boundaries, all interfaces between them are defined in IDL. Similarly, all interfaces offered by the AAM to client applications are defined in IDL.

Alarms for all APs are represented in the AAT managed object, such that there is an alarm record for every class of maintenance unit that has an alarm currently active in an AP. Additional managed objects are introduced in the object server to track alarms in other maintenance units related to the AP (e.g. ApFrameActiveAlarms) or in another network element 14. As with the AAT, however, the alarms tracked by these managed objects will be reported to client applications via the AAM process.

The AAM system process contains a table of active alarm records which mirrors that of the AAT managed object. At initialization, the AAM registers with the AAT managed object for delivery of current alarm records and notifications of subsequent updates. Multiple clients can register alarm filters and callbacks for delivery of alarm records that match specified filter criteria. Client applications can change or cancel their specified filter criteria.

UX Proxy

Provides UX messaging interface to the IDS 79 to receive and process IDS triggers. A trigger is needed to notify the element management system when an AP is added to or deleted from the system. The element management system then polls the AP for its equipage data.

ROP Formatter

Formats the events in a format consistent with the ECP ROP formatting requirements, and sends the formatted event to the ECP for logging and printing at the ECP ROP.

This component is a client that resides on the element management system server and provides the following functionalities:

Registers with the Event Distributor for all events

Utilizes the locale text formatting services to format the raw event as a TI/OP message Formats the events in a format consistent with the ECP ROP formatting requirements Includes in the message the appropriate alarm indication Sends the formatted event to the ECP for logging and printing at the ECP ROP Utilizes a new message class at the ECP for reports This mechanism will rely on a single message type for forwarding all element management system-generated TI/OP messages. The current interface from a mobile switch center (MSC) ECP ROP supports specifying Alarm Level (MAN, INFO, CRIT, MAJ, MIN).

Command Line Interpreter

The command line interpreter provides an ASCII command language to allow the technician to enter commands and observe the command results. The input command syntax is the same PDS format used by a proprietary system. Command reports are also formatted in the same syntax as the existing proprietary system.

Provides ASCII based input language access to all commands for network elements (and their maintenance units) supported by the element management system.

Provides an acknowledgment to the input command to indicate the disposition of the command.

Allows for multiple commands to be outstanding at one time

Provides command sequence numbers to correlate acknowledgments and responses with commands Provides a final report indication for command responses.

Infrastructure and Application Specific Components

The architecture contains components that provide a general infrastructure for network management and components that are application specific. This section lists the components from FIG. 4 in infrastructure and application specific categories. Some components consist of infrastructure and application specific code (e.g. command line interpreter) and are noted as such.

Figure 7:
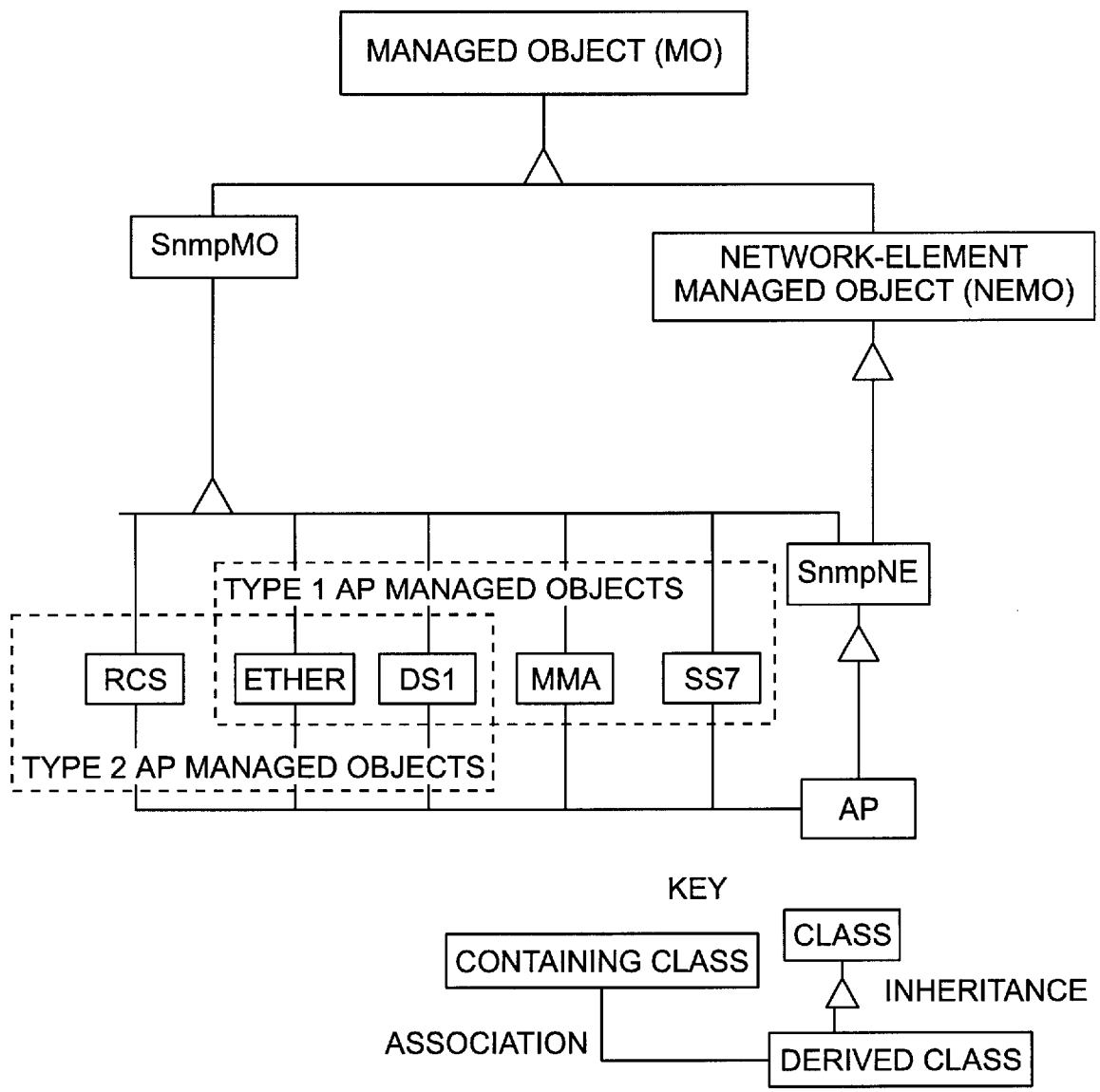
FIG. 7 is a functional block diagram showing the derivation of application process

The following components are considered to be infrastructure related:

Object Server
  Client Session Manager
  Event Distributor and Screener
  element management system Command Handler
  SNMP Mediator
  Managed Object Base Classes (ManagedObject, NEMO, SnmpMO, SnmpNE, see FIG. 7).

UX Proxy

Active Alarm Manager

Client Active Alarm Browser Application

Client System Alarm Summary Application

Client Network Element Detailed Status Application

ROP Formatter

Command Line Interpreter. Portions of these components are specific to the application, e.g., the screen contents and layout will vary depending on the particular traits of the application managed.

The following components are considered to be application specific:

Commands and reports for the network element

Application-specific Service Objects of type Managed Object, SnmpMO, SnmpNE

Managed Object Model

In this architecture, all resources and elements that can be managed are represented in the system as a managed object. Each managed object provides attributes, methods and notifications that are used by client applications to manage the object. In order to describe the managed object model used by this architecture, the following terms are defined and used in subsequent descriptions.

All instances of a type of managed object share definition of attributes, operations, notifications and behavior, but will have attribute values that are unique for each instance of managed object. This approach allows common behaviors for managed objects to be defined in base classes, and for specialized behavior to be placed in the managed object class for that specific type of managed object (while inheriting the common behavior and attributes of the base class). More specialized forms of managed object classes can be developed by subclassing existing managed object classes, providing for reuse of existing classes. Subclasses will often add attributes, extend or restrict ranges of existing attributes, and add or restrict operations and notifications. This concept helps to encapsulate rules regarding the behavior of managed objects within the managed object class. This prevents the common practice of replicating this functionality (often in varying ways) in the different applications that provide management for the element. FIG. 7 shows an example of how this approach can be used to define some of the managed objects. It also shows how it could be used to derive specific types of AP managed objects. Note that this is only an example to demonstrate the concepts described above.

For SNMP based managed objects, the definition of the managed object and most of the managed object's attributes can be derived from the definition of the MIB 55 (generated by a tool that parses the MIB). Also, most of the code necessary for translation between the MIB ASN.1 format and the EMAPI 55 object notation (performed in the SNMP Mediator) can also be derived from the definition of the MIB 55. Automation of this translation will reduce maintenance of the system and will reduce development of new managed objects when new network elements are added to the system.

The client interface to the services and the managed object attributes and methods is described in the EMAPI 55. The EMAPI 55 and managed object notation provide a consistent model of all managed objects in the network, hiding the implementation details associated with the element manager platform from client applications (for example, clients do not need to know whether the underlying protocol to the network element is SNMP, CMIP or a proprietary interface). Managed object specific logic is encapsulated within the managed object instead of scattered throughout various applications, thus simplifying client application development.

Managed Object Notation

A distinction is made in this model between the actual objects present in the server to provide services for a class of managed objects and the specific instances of those managed objects (and their attributes). Instead of creating object instances for all managed objects in the system which can become prohibitive on large element management systems where network elements contain a large number of managed objects, a single service object is created to provide services for a class of managed objects. Specific managed object instances and their attributes are referenced by use of a set of object class identifiers and attribute codes. The definition of these managed object class identifiers and attribute codes is part of the interface definition between all service objects and their clients.

Managed Object Identifiers

A specific instance of a managed object is referenced using its object identifier which consists of the object class code and an instance identifier. The object class code is a static enumeration or constant, and the instance identifier is an integer value (defined at run time based on configuration) that is unique to the object class. Although the instance identifier is unique to the managed object class, it is not the same as the logical number for that instance. Each managed object class provides methods for translating between the instance ID and an appropriate set of network element and unit identifiers.

For example, AP network elements are referenced by logical number in the system (e.g. 1 to n). The number of Aps in the system is not fixed at a specific number (such as 8) but will be based on the equipage information found in a database. Each AP also can have some number of application virtual machines, each identified by a logical number (e.g., RCS 1).

A specific instance of an application managed object is referenced by calling a lookup function in the application's service object to convert the AP network element instance identifier and application key into its associated instance ID. The combination of these two values in the object identifier uniquely identifies a specific managed object instance.

In many cases, the use of a service object for a class of managed objects will take the place of the object class code. For example, the AP object class code is not specified by a client when requests are made through the AP service object. Conversely, the AP object class code would be present in any events sent to a client so that the client can identify the specific managed object instance that generated the event.

Attribute Codes

Each managed object contains a set of attributes specific to that instance of that managed object class. These attributes describe various maintenance, operational, configuration and measurement information about the managed object. Each attribute is defined with an attribute code that is local to the name space of the managed object to which it belongs. For example, the AP managed object class will have a State attribute (as will the RCS managed object class). Each attribute code is unique to the managed object class to which it belongs.

Attribute Value Definitions

The type definition for any attribute value that is not of a basic "primitive" type (for example, short or octet) and is used between the clients and the server must be defined in the IDL. The scope of these definitions may be limited to the managed object that uses them, or may be at a higher system level (for example, alarm level definitions would be at a system level).

Adding New Managed Objects

When adding new types of managed objects in the system, a choice must be made to create a new type of managed object service class, or to use an existing service class and provide the ability to distinguish between different versions or types of managed objects in that class. The decision to use a new class or extend an existing class will depend on how similar the new type or version of managed object is to the existing managed object. When using a common service class, an attribute of a that class could be used to provide discrimination between various versions/types of the same managed object. If a new managed object type is created, any common attributes and functionality with other similar managed object classes should be placed in a common base class to reduce maintenance. To summarize the guidelines:

Create a New Managed Object for new maintenance unit types that are unique to the system.

Subclass an existing Managed Object (or move common functionality to a base class if it doesn't exist) for new maintenance unit types that provide common existing attributes. Note that this will still result in a new managed object type. An example of this is the Ethernet interfaces on the AP. They both provide common Ethernet functionality but there is an ethernet interface node (EIN) and a LAN managed object.

Use version attributes for different versions of the same managed object. Support both hardware version and firmware revision attributes is needed.

When adding new AP processors that support additional functionality (examples of this may be IS-634 applications) new types of managed objects will be defined to manage the new types of objects within that type of AP. If all AP processors are capable of hosting the additional hardware and software entities (for example, in later releases an AP hosting RCS virtual machines could also have SS7 hardware and host IS-634 functionality), then a MIB supporting the superset of possible managed objects must be constructed and made available for compilation into element management system runtime processes. This approach makes use of automatic code generation, and is intended to save time when adding new objects to the element management system. At the element management system, additional service objects must be created to support management of the instances of the new classes of managed objects (e.g. MMA).

Portability

The development of this architecture must ensure portability of the client and server components. This can be accomplished in several ways. Machine and operating system (OS) dependent code should be hidden as much as possible (especially when there are multiple interfaces to it within the server) by placing it within wrapper libraries. For example, the Element management system Logger class will provide object-oriented wrappers for all existing propriety UX logging services (UX_ELOG, UX_DLOG, UX_PLOG and UX_ALOG). This allows for platform retargetting by changing the implementation of the machine/OS dependent libraries with no impact on the calling functions or objects. Interprocess communication will make use of industry standard software such as CORBA which is available on most machine and OS platforms.

Object Server Components

This section describes the major components of the Object Server in detail. Each of the components may be represented as the element management system, processes or classes but are treated as general components in this section. Note that many of the descriptions provide general examples (not AP specific) since most of the components provide an infrastructure that is intended to support the migration of all OA&M for additional applications.

Client Session Manager

The Client Session Manager will maintain a list of active client sessions and applications. It will periodically audit that list to detect sessions that have gone away without explicit termination (e.g., loss of connection).

The following functionality will be provided:
Interface to clients for starting a session
 Creating a unique session identifier
 the future, validate client security and permissions (see earlier section, "Security", for a more detailed discussion)
Interface to clients for manually ending a session
Interface to clients for periodic check-in (heartbeat)
Interface to other server components for registering interest in notifications of session/application termination. The components that have such an interest are:
 The Event Distributor, which is interested in all such terminations
 Managed Object Service Classes, which are interested only in specific client session/applications.
Periodic audit of active sessions/applications to see if any session/application has failed to check in recently. Sessions/applications that have failed to check in within a reasonable (to be determined in design) amount of time will be removed from the session manager's active session/application list Notification to registered entities when a session/application has been ended via the callback notification interface described above.

Event Distributor and Screener

The Event Distributor is responsible for filtering and routing of all events in the system. A client that wishes to be notified upon the occurrence of one or more events (other than attribute-change notifications) registers a filter with the Event Distributor specifying criteria to be matched against whenever an event occurs. Examples of clients include the Summary Alarm/Status Manager, ROP Formatter, Managed Objects, and clients issuing manual maintenance requests. No formatting of events is performed within the Event Distributor—this is left to the application. Events are typically generated as a result of a trap from an SNMP agent, but can also be generated by element management system components on the same machine, or even by other legacy network elements. The Event Distributor may be implemented as a set of objects within the Object Server.

The Event Screener supports screening of events before they are seen by the Event Distributor for the purpose of simple, open-ended event correlation. The Event Screener supports the same interface (although not available to clients) as the Event Distributor, but is only for use within the Object Server.

The following subsections show the functionality provided by the Event Screener and Event Distributor.

Client Registration and Filtering

Provide an IDL interface (Event Distributor Only) for registering filters based on the following:
Session and Application ID
Callback object, used to deliver events to the interested registrant.
Filter object containing a specification describing events to be delivered to the client. This filter allows for a limited set of parameters that provides for specification of a set of event attributes that may be combined to limit the set of events. Specific values for event attributes can be given or a special don't-care value that can be used to ignore the attribute.

The event filter will contain the fields in the list below. Note that not all these fields must be set; those that do not matter can be marked don't-care as described above.
Event Category
Network Element instance ID and class code
Network Element alarm level
Maintenance Unit instance ID and class code
Maintenance Unit alarm level
Command ID (client session ID and command sequence number)

Provide an IDL interface for clients (Event Distributor only) and other Object Server components to explicitly cancel a specific filter.

Provide a means for Object Server components to remove all filters associated with a specific session and application.

Provide an efficient method to store client registrations and filter criteria and an efficient method to examine these filter criteria on incoming traps.

Event Receipt

The Event Screener receives events from the SNW Mediator (which receives traps from SNMP agents and translates them into EMAPI 55 event headers)

The Event Distributor receives events from the Event Screener and other Object Server Service Objects.

Match an incoming event header against each stored event filter. The event header will contain fields that match those of the event filter (given above). In addition, the event header will contain:
A time stamp indicating when the event was generated Provide delivery of traps to clients using the client-supplied callback function (for events that match their supplied filter criteria)

The Event Distributor will play no role in event throttling: throttling will occur at the SNMP agent.

Auditing

Support cleanup of the filter list, through audits performed by other Object Server components. This support is provided through the interfaces described above or via internal callback mechanisms. For example, when the Client Session Manager removes a session and/or application from its internal structures, it notifies the Event Distributor via a callback, at which point the Event Distributor removes all filters associated with the session and/or application.

Filters associated with commands need to be cleaned up under several circumstances:
When the final report indication is seen in a command event
When the trap containing the final report indication is lost The Event Distributor will receive a notification when either of the above circumstances are detected, at which point the filter matching the affected command or commands will be removed.

Command Handler

Because various resources are utilized within the element management system server to process managed object commands, the Command Handler must track active commands and release resources when the commands are completed. Active commands are modeled as another class of managed objects within this system, and the Command Handler represents the service object for all instances of active commands. The Command Handler provides the centralized tracking and management of these commands. Since command responses are delivered via unreliable SNMP traps, an audit of command activity between the network element and the Command Handler must be performed.

Command Block

Command blocks will contain at least the following fields:
Command Sequence Number
Session Identifier
Object Instance Identifier (for example, which AP? Or which DS1?)
Command Type
Command Qualifier (optional)

Some commands may require additional arguments. Since each command block is defined separately, it is simple to implement additional arguments.

Command Responses/Acknowledgments

Each agent must generate an acknowledgment trap in response to each command request containing the originating session identifier and command sequence number along with an acknowledgment value indicating whether the command request is invalid or could not be processed, processed as requested with no further response, or in progress with additional response pending. In the latter case, one or more command response traps will be generated which also contain originating session id and command sequence number, along with a response sequence number and final report indication. Since UDP messages may be received out-of-sequence, the response sequence number may be used by a client application to reorder multiple responses for the same command.

Command Filter Cleanup

The final report indication will be used by client applications to note when a command-initiated action is completed, and will also be used by the server to automatically de-register event filters associated with that command. Each agent will support an active command table listing the session IDS and command sequence number of all commands in-progress. This table will be audited periodically by the server to initiate filter removal when final report traps are lost.

SNMP Mediator

This functionality provides translation between the EMAPI 55 class and attributes and the IP addresses and object identifiers of the SNMP MIB. It is also responsible for formulating appropriate SNMP requests (SNMP SET requests for maintenance requests, SNMP GET requests for polling and auditing) and routing responses back to the requester(s). It queues SNMP requests and ensures that no single Network Element SNMP Agent is overwhelmed by a burst of requests. Note that there is no client access to this component; it exists solely for internal use within the Object Server.

SNMP to EMAPI 55 Translation

This functionality will perform translations between the EMAPI 55 Object Class, Instance Class and Attribute Code notation and the SNMP IP Address, SNMP MIB Object Identifier (OID) and zero or more SNMP variable bindings. It may be implemented as a set of objects and methods within the Object Server.

The types of translations this service must perform are:
EMAPI 55 Command object to SNMP Command Block
EMAPI 55 Poll-Request object to SNMP Get
EMAPI 55 Instance ID/Class Code to SNMP IP Address
SNMP Get Response to EMAPI 55 Poll-Response object
SNMP Trap to EMAPI 55 Event Header
SNMP IP Address to EMAPI 55 Instance ID/Class Code Object Server Interface Provide an interface to managed object classes in the object server to support:
Auditing: the periodic polling of configuration data and persistent attributes (persistent in element management system memory) that the Object Server tries to keep on the server at all times (these attributes are stored in memory for use by multiple clients, and are not saved over a reboot of the element management system).
Polling: the periodic polling of attributes that are requested by one or more EM Clients.
One-Time Status Requests: a single request for an attribute or attributes.
Command Execution: issuing commands using SNMP SET requests.

SNMP Interface

The SNMP Mediator handles all interfacing with SNMP agents on network elements. The SNMP interface consists of Attribute Polling, Configuration Auditing, Command Execution, SNMP Retry Mechanism, and Trap Delivery.

Attribute Polling
Use the HPOV SNMP API or the CMU SNMP library to establish an SNMP session to each AP agent
Use the EMAPI 55 to SNMP Translation component to translate between EMAPI 55 notation and the appropriate SNMP get request
Translate the response to an SNMP get request to EMAPI 55 notation and route it back to the associated managed object, which then checks for and propagates only those values which have actually changed
Provide control over the number of outstanding get and set requests to an agent. This is necessary to prevent overloading the socket at the agent.

Configuration Auditing

AP equipage is maintained via recent change. Configuration information for sub-network-element level components is maintained by each AP agent. When more than one managed object instance may be associated with an AP (e.g. RCS), the respective managed object is defined by a MIB table which is indexed by one or more configuration attributes (e.g. cell number). Associated with each table is another MIB object identifying the current number of table entries (the table count). Configuration information for any table may be retrieved by sending a GET request to the agent for the table count, and one or more GET-BULK requests to retrieve index information (also known as keys) for all valid rows in the table. The SNMP Mediator will perform a periodic audit of each table in this manner to report current configuration information to each associated managed object.

Command Execution

The SNMP Mediator will use the EMAPI 55 to SNMP Translation component to translate from EMAPI 55 commands into the appropriate MIB command block settings. The SNMP Mediator will translate EMAPI 55 commands into the appropriate MIB command block and issue an SNMP SET.

Command Queing

Because SNMP requests are sent via UDP and may be received by an agent out of sequence, a command request/response convention between manager and agent will be utilized to insure that an agent will respond only once to a single command (i.e. SET operation) regardless of the number of retries which may be generated. The manager will maintain a separate command SET queue for each network element. The size of the command SET queue per network element is preferably tunable. Only one SET request for any given network element will be pending at any one time. That is, a command protocol data unit (PDU) will not be sent to the associated agent until the SET response from the previous command is received. Once the SET response has been received, other commands are initiated and sent to the associated agent. Each PDU contains a monotonically increasing request id, which will be examined by the agent on all SET requests. If the id is greater than the last processed, the PDU is presumed to contain a new request and will be acted on accordingly. If the request id is equal to the last processed, the agent will assume the duplicate packet is the result of a retry, and will return the response last generated. If the id is less than that last processed, it is presumed to be a duplicate packet for a command to which the manager must have already received a response (or timeout), so the packet is ignored.

Failure Handling

When the SNMP Mediator receives a SET request from a managed object for delivery to a network element that is known to be not responding, the request will still be processed as received. If an associated PDU can not be sent, a negative acknowledgment will be generated locally, and returned to the originating client via the event distributor.

SNMP Retry Mechanism

Since SNMP relies on UDP as the underlying transport protocol, SNMP GET, GET-BULK, and SET operations can be lost. To recover from losses, the SNMP Mediator will use a mechanism for retrying SNMP transactions that will be consistent for all GET, GET-BULK and SET operations and will conform to the interface prescribed by the HPOVNNM SNMP library or the CMU SNMP library. For further information, see the reference to HPOVNNM or CMU SNMP library, previously incorporated by reference herein. A predefined maximum number of retries may be attempted for each request. There is a tunable timeout that is logarithmically increasing (defaults to a maximum retry delay of 12 seconds per request is suggested). If a response for any request is not received after the maximum number of retries, each of the managed objects associated with this network element is notified of the loss of communication and a local event is generated, resulting in an alarmed output message being delivered to the ECP ROP. State values in the internal status tables will be set accordingly, and these changes will be propagated to registered clients via callback. The polling queue for the network element is made idle until a subsequent audit or any trap indicates that the agent is back online.

Trap Receipt and Delivery

The SNMP Mediator will receive traps from SNMP agents. The outline of this mechanism is as follows:
- At initialization, open a trap session with the HPOV SNMP infrastructure
- For each trap, translate the SNMP trap PDU into an EMAPI 55 event header
- Deliver each EMAPI 55 event to the Event Screener for filtering and delivery to registered clients.

MIB-to-IDL Mapping

A means will be provided to automate the maintenance of MIB changes and the corresponding EMAPI 55 managed-object notation. An engine that includes an ASNI MIB parser will be used to generate IDL and other files that depend on the MIB. The goal will be to minimize the amount of hand-crafted and maintained IDL.

MIB Conventions

MIB conventions will be defined and documented in coordination with the development of the AP agent.

Service Object Description and Infrastructure

Figure 8:
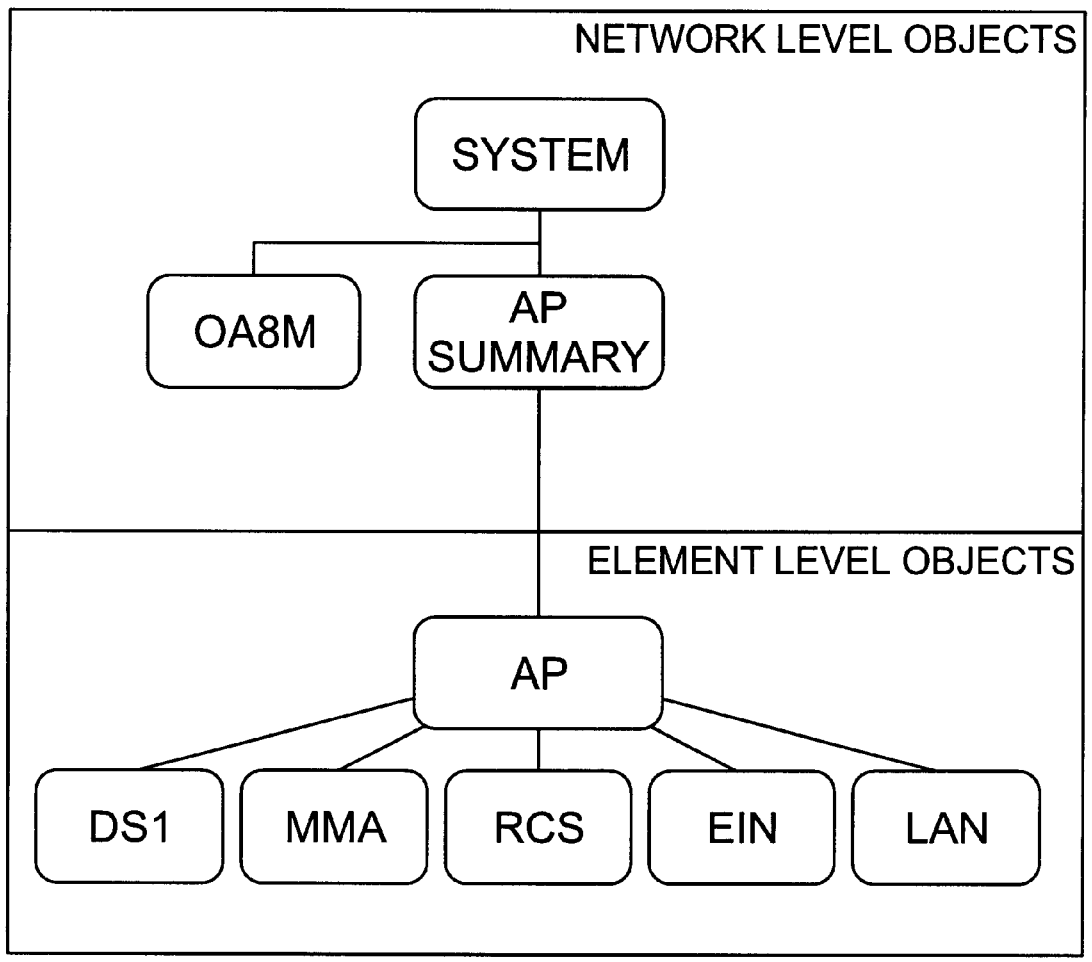
FIG. 8 is a functional block diagram of managed object classes and their containment relationship that may be used to manage to application process.

A service object exists for each class of network element, maintenance unit or logical object within the system. As shown in FIG. 4, these are labeled SnmpNEMO and SnmpMO Class Objects. Each service object instance provides services for client application access, and maintains a view of the attributes (as needed) for all instances of managed objects in that class. Example service objects include the AP, RCS and DS1. Examples of logical service objects include System and APSummary. FIG. 8 shows managed object classes and their containment relationships that may be used to manage the AP. FIG. 8 also shows some example Service Objects that may be added in the near future to manage other telecommunication network elements. The OA&M shown can host the element management system.

Figure 9:
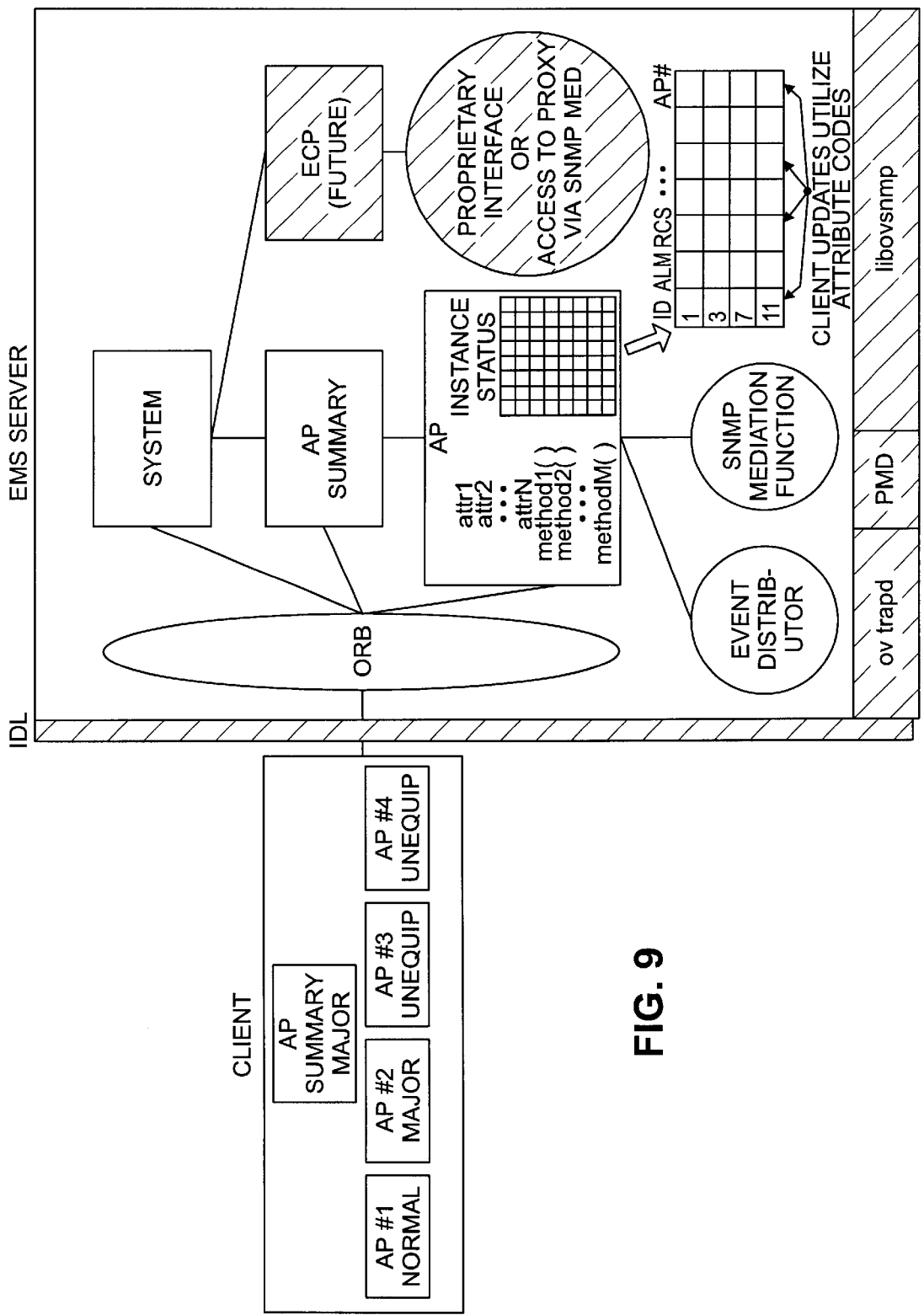
FIG. 9 is a block diagram showing a network element, AP, service object and the data it contains and an ECP managed object using a protocol other than SNMP for communication.
Figure 10:
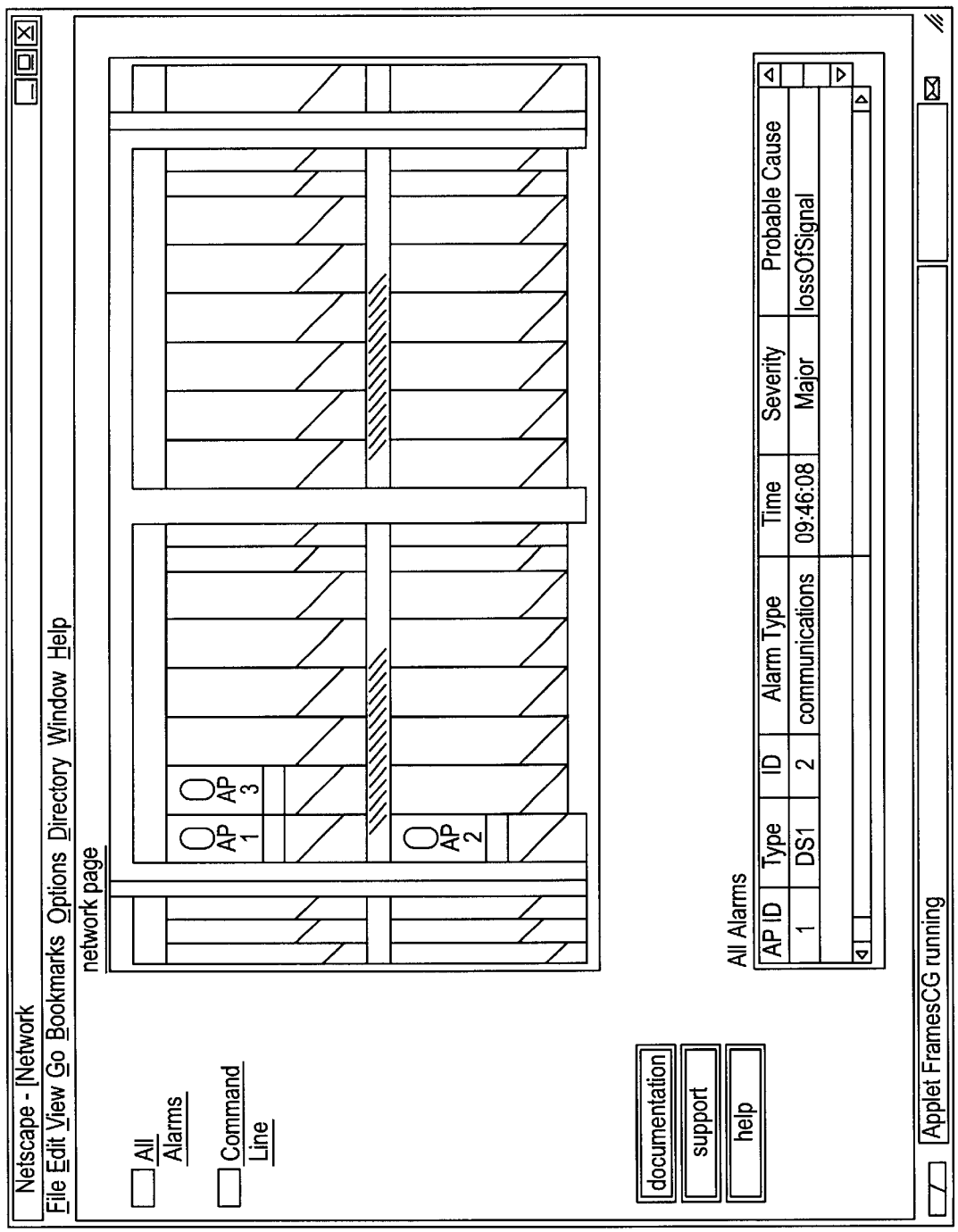
FIGS. 10, 11, 12 and 13 show representative web pages in accordance with the invention.
Figure 11:
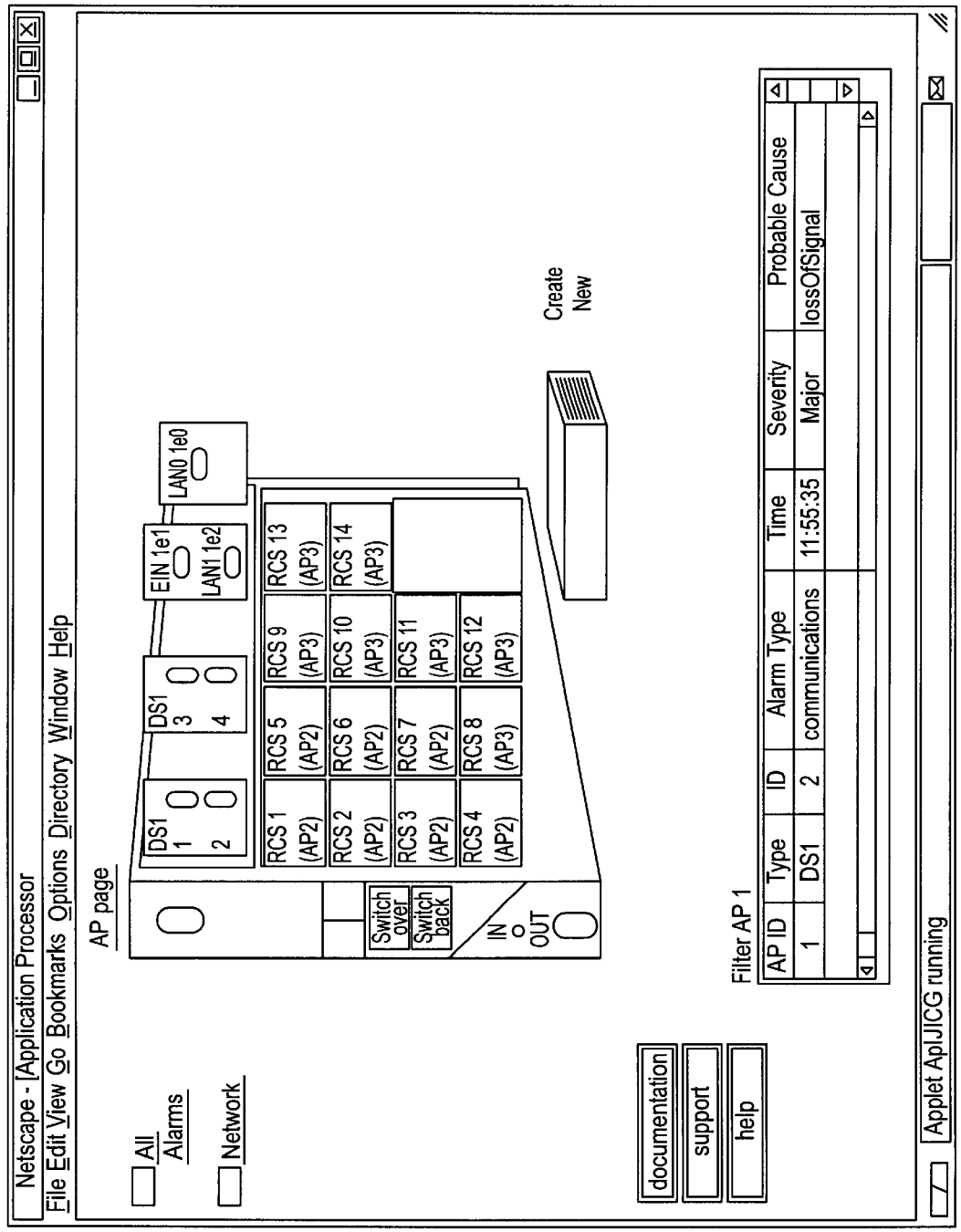
Figure 12:
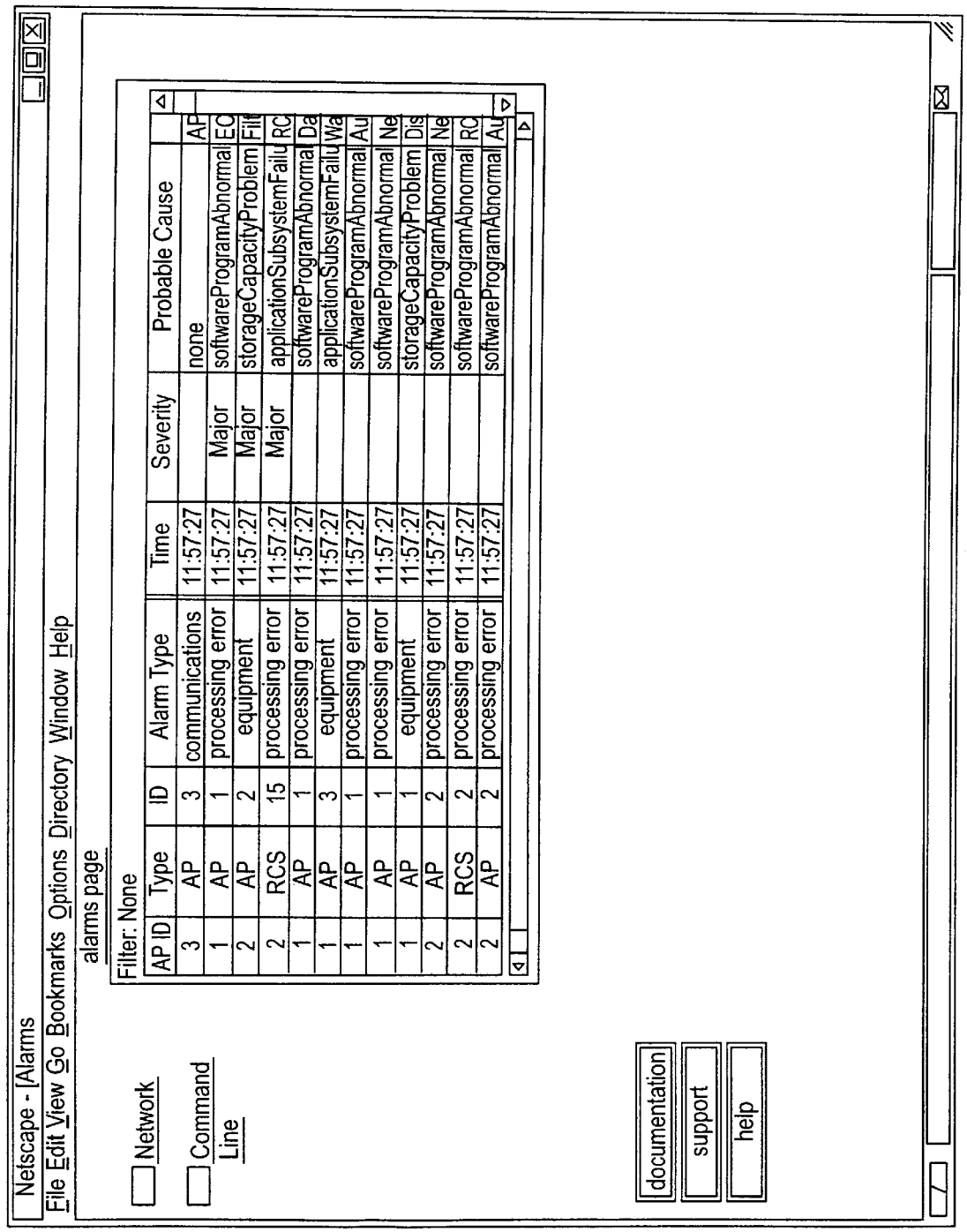
Figure 13:
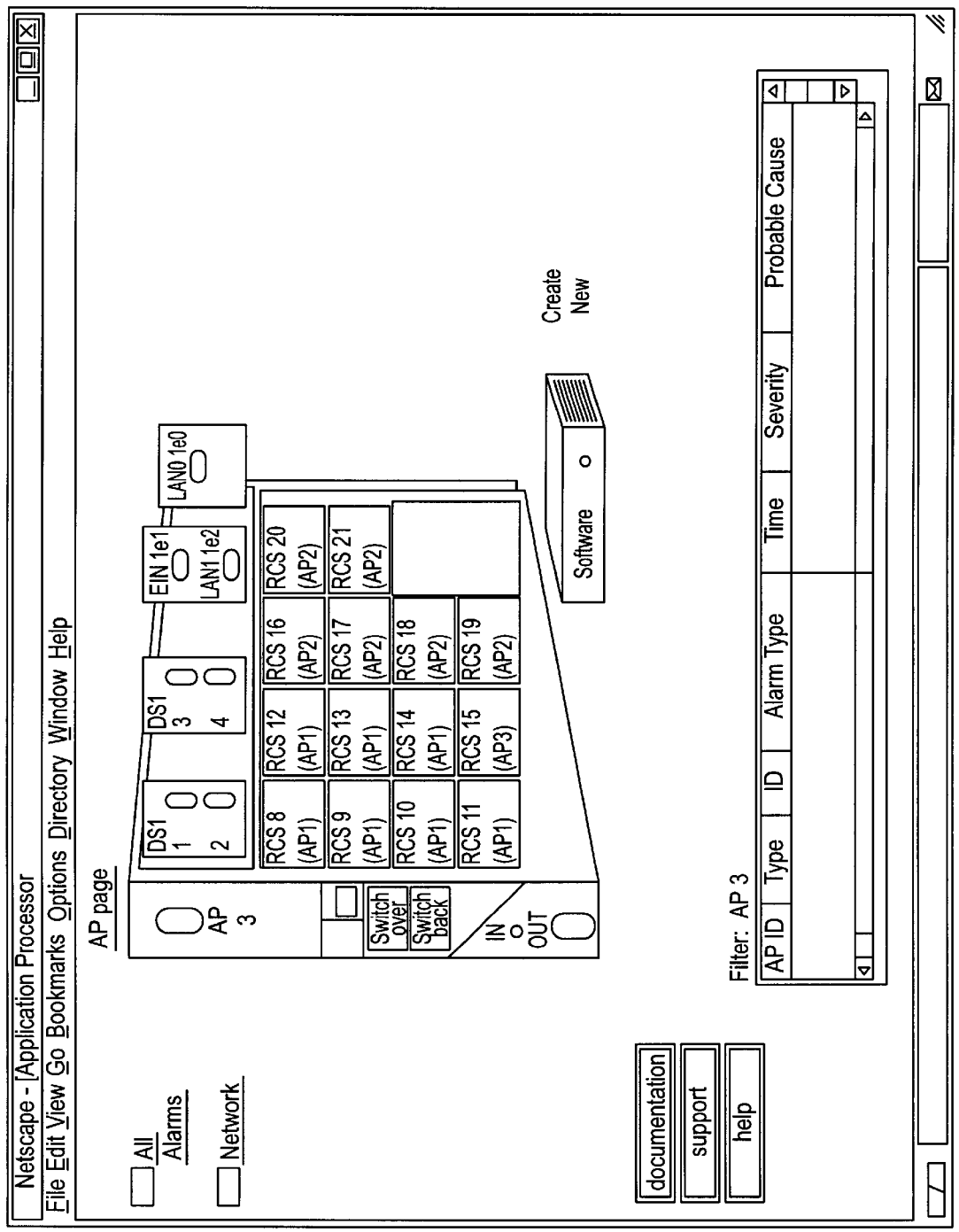

To maintain attribute values and provide client notifications for attribute changes, each service object maintains a status table dynamically sized according to current configuration data and client polling needs. Information in this table will be identified through a class dictionary containing attribute codes and type information, available via common interface definition to both server and client code. For example, the AP object may contain attributes for maintenance state. Client applications will gain access to that state information for a specific AP via class methods which accept instance identifiers and attribute codes. The service object provides a centralized place where network element status is recorded. Instead of each application polling for attributes it needs, the service object manages a list of the registered clients and the attributes they are registered for. The combined set is then polled for by the SNMP Mediator. Additional class methods will be provided for performing operations specific to the unit type, such as remove, restore and diagnose. The specific protocol used for communication with the network element is specified by the service object. The SNMP protocol is used for communication between service objects associated with the AP and the AP network element. Other managed object classes could be added that utilize a different protocol and encapsulate that knowledge in the managed object class. FIG. 9 depicts an AP service object and the data it contains. It also shows an example ECP managed object that could use a protocol other than SNMP for communication.

Client Notification and Request Response

Each service object will provide methods for client access to attributes of its managed object instances. In addition to requesting the current value of attributes, clients can register for notifications of any changes to attribute values. Client access to attributes and registration for attribute notification is specified in terms of the following.
- A set of attributes for a specific instance of a managed object
- A client callback function for delivery of initial attribute values and subsequent changes All attribute values are delivered to the client by the client supplied callback object reference. A sequence of attribute code and value pairs are sent as an argument to the callback object reference. For the initial notification, the sequence contains the values of all requested attributes. For subsequent notifications of attribute changes, the sequence contains only those attributes that have changed.

Client Command Request/Response

Each service object for a class of network elements or maintenance units provides member functions to implement requests for operations on specific instances of the class of network element or maintenance unit. For example, to remove a DS1 unit from service in the AP, the remove method of the DS1 service class is invoked. As with any other client requests, the client must have created a session prior to performing this operation. The specific instance of the maintenance unit and any command specific parameters must be specified. The operation will return a command sequence identifier (commandSeq) that is unique to the client session. The command sequence identifier is present in the header for all subsequent events (Acknowledgment and Command responses) for the command.

Once the operation is validated at the server, a filter is registered for the client with the Event Distributor for all events that match the client's session and the command sequence identifier associated with the command. After successfully registering the event filter, a command request is sent to the SNMP Mediator where the instance is converted to the appropriate IP addresses and MIB command block values and generates the appropriate SNMP Set request. Command acknowledgments and command responses are transmitted from the SNMP agent by means of SNMP Traps. At the server, they are converted to Events and routed to clients with matching event filters. Note that there is a retry mechanism for SET requests where the element management system does not receive an associated SETRSP (detailed in the SNMP Mediator section) but no retry is attempted when a command fails (such as in the case where a failover was in progress).

System initiated commands and responses will be routed similarly, using unique system session identifiers and callback functions. An example of this type of command would include a request to output the system status (OP) where a logical service object is responsible for servicing the request and generating the responses. These commands are processed within the element management system server and not by a network element through the SNMP interface. The element management system server must generate the command acknowledgment and command response events itself since it is responding to the command internally.

The network element agent is responsible for providing an acknowledgment trap indicating if the command request was accepted. Results of the command are then delivered from the network element agent by a series of 1 or more command response traps. The last command response trap contains a last response or final report indication which is to be used within the server to detect the end of the command and to release server resources associated with the command (e.g. event filters). Since the command responses could be lost, a low level audit of command activity must be performed between the manager and the network element agent. The audit does not require that the agent keep command response information. The audit only checks to see if the command is still running at the agent. If a command response or trap is lost there is no recovery to regenerate the lost response. For cases where the network element cannot generate a command acknowledgment, or the acknowledgment is not received at the element management system server, the element management system server is responsible for generating an appropriate acknowledgment back to the client. The following summarize cases where the element management system Server is responsible for generating the acknowledgment event back to the client:

1. Can't transmit command block SET PDU to agent
2. No SETRSP received from the agent (after repeated retry of SET request)
3. SETRSP from agent indicates an error (such as an invalid object identifier)

In all other cases where the agent receives the SET request and is able to "understand" its contents the agent is then responsible for generating the acknowledgment (either positive or negative).

Object Attributes

The following types of attributes can be associated with each managed object. For each category of attribute, the source of the attribute data differs (e.g. network element trap, network element polling, element management system local data). It is not required that all managed objects support all categories of attributes, instead the presence of the attributes is based on the needs of the managed object (for example, some managed objects have no state attribute, but have an alarm attribute.

Persistent Attributes

State and alarm attributes for managed objects are always maintained even if no clients are registered for the attribute. These attributes are updated by trap notification from the network element (and are audited by a low level periodic audit poll controlled by the Snmp Mediator). Maintenance state is delivered by state change notifications, and alarm level attributes are delivered by alarm set/clear notifications.

Configuration Attributes

These attributes constitute configuration related information. These attributes are updated as a result of an event notification of configuration change on the managed object. When a configuration event notification is received noting either an insert or update of configuration, the managed object performs a single request to get the current values of all attributes for the specified (this is also known in SNMP as trap directed polling). When the configuration event indicates a configuration delete, the managed object performs the associated deletion of the instance. As with Persistent attributes, config attributes are audited by a low level periodic poll controlled by the Snmp Mediator (in fact it is the same audit). An example of this type of attribute is apLogicalId. Note that some attributes marked as Config only change when the SNMP agent reboots. Therefore, the network element will never issue any config change notifications on these attributes. They are categorized as config because the managed object requests their values along with other config attributes when the config notification is received for a new instance of the managed object.

Audit Attributes

The value of these attributes are only maintained through a periodic low level audit. Examples of this type of attribute are the active command table command session and command sequence number.

Polled Attributes

The current value of these attributes are only maintained if a client is registered for notifications of changes to the attribute. These attributes are polled for at a 15 second polling rate by the SNMP Mediator. An example is the AP sysUpTime attribute.

Internal Attributes

These attributes are based on internal data or derived from other attributes. An example is the isolated attribute in the AP network element. Its value is based on an isolation indication detected by the SNMP Mediator when communication is lost to a network element (or subsequently restored). For SNMP based managed objects, all attributes that are not internal, directly represent an associated MIB attribute.

Service Object Base Class Functionality

Much of the basic behavior of each object is present by means of inheriting base classes that contain the specific manager functionality. For example, client registration and polling will be defined in base classes shared across all service objects. The following sections describe these common behaviors available to all service object classes.

Managed Object Base Class

This class provides definitions of the basic interfaces that all managed objects must support. This includes providing client interfaces for things such as managed object configuration notification and attribute update notification. Specific service objects would all inherit this base class.

NE Managed Object Base Class

This class (derived from managed object base class), provides network element specific functionality on top of the basic managed object class. This includes providing client interfaces for network element configuration notification. It is responsible for handling network element related equipage notifications from configuration data services (AP equipage changes) and notifying the SNMP Mediator of these changes. The SNMP Mediator must be notified of these changes in order to provide appropriate routing and translation between the Managed Objects and the network element. Specific network element service objects would all inherit this base class.

Client Notification Registration

Each service object must manage a list of clients and the attributes for which they are registered. This list must contain a session handle, the list of attribute codes, and the instance identifier(s) for specific managed object instances. This functionality must also provide methods to efficiently search this list based on attribute code and instance identifier so that registered clients can be notified of changes. Client registration must be coordinated with the Client Session Manager to provide for graceful cleanup when abnormal client termination is detected.

The Client Registration Functionality
- Provides interface to clients for attribute registration given the following parameters
  - client session id
  - managed object instance identifier (specific id, range, or all in class)
  - set of attribute codes
  - callback function for delivery of changes
- Provides general container and data structures for managing a list of client registrations
- Provides methods for construction and delivery of client callback with attribute code/values.
- Provides interface with client for de-registration
- Provides interface with Client Session Manager for de-registration when abnormal client termination is detected via audit.

Polled Attribute Management

Attribute polling is needed for element management system initialization (e.g., upon element management system initialization, the only way to obtain status is through polling), attribute values that are not trap-directed, and audits (i.e., UDP is an unreliable transport and as such, traps may be lost). Trap-directed attributes are stored on the element management system in memory for use by multiple clients. There may also exist other attributes whose value is only obtained through polling, and that polling will only be initiated when a client has informed the object that it is interested in notifications of state changes to those variables. In that case, the object must request that the SNMP Mediator poll network element at regular intervals (15 seconds) to determine if any of the variables of interest have changed. If a change is detected, registered clients must be notified by means of a client callback. These polled attributes are also stored in memory. The manager of these attributes are as follows:

- Maintains the attribute table (allocation of attribute table, instance identifier management, changes to the attribute table based on configuration changes)
- Informs the SNMP Mediator of the current set of attributes that are to be polled. When a client registers (or de-registers) the set of attributes that must be polled for may change. If it does, the SNMP Mediator must be informed.
- Handles poll responses from the SNMP Mediator. When a set of polled data is delivered (via server callback function) attribute values must be compared with the current values in the attribute table. When the value has changed, the value in the attribute table is updated and clients must be notified of the change. Note that if more than one attribute has changed for a managed object instance, the changes will be grouped and delivered to each registered client on a managed object instance basis.

Trap Directed Attribute Polling Management

For network elements utilizing SNMP, all alarm, configuration changes and basic state changes (including non alarmed maintenance states) are delivered to the manager from the Agent through the use of an enterprise specific SNMP trap. These traps are received by the SNMP Mediator where they are translated into EMAPI 55 Events and passed along to the Event Distributor. They are then delivered to all clients that have registered a filter matching the data in the associated Event. The Summary Alarm/Status functionality of each class of objects registers a filter with the Event Distributor to request delivery of all alarm and state change events for all instances of objects within its class. When a alarm or state change event is received by the Summary Alarm/Status Manager, the attributes for the appropriate instance are updated, the summary attributes for the class are updated, and all clients registered with the object for state change notification on the affected attributes are notified via their client callback functions.

- Registers appropriate filter with Event Distributor for all events on instances of this managed object class (alarms, state changes, configuration notifications).
- Handles events from the Event Distributor. When a trap is received, attribute values in the Event are compared with the current values in the attribute table. When the value has changed, the value in the attribute table is updated and clients must be notified of the change.
- Interfaces with SNMP Mediator to perform low frequency (audit) poll of attributes in the managed object class associated with traps.
- Handles low frequency audit poll responses from SNMP Mediator.

Client Interface Components

The following sections describe the components present on a client of the element management system server to provide the client interface to NE management. Specific client interface style and content will be addressed after the architecture with input from human factors and element management system engineering. In addition to making the client interface as easy to use as possible, the client interface must retain similarities with the current maintenance model such that little retraining of the end client (technician) is necessary. Sample Web pages can be found in the attachments to this document.

AP or Network Element Telnet Access

Direct cut-through access to the AP is required to perform system administration and some configuration functions, and as a means to access the AP command line interpreter if the element management system is not operational. To provide this access, the client platform must support a telnet application and a suitable terminal emulation to run a visual editor such as vi. On an X terminal, an xterm terminal emulator and use of the telnet application will be sufficient. On the Microsoft Windows platform, use of an X terminal emulator will provide the same access as an X terminal, or the Windows telnet application on a PC may be used.

WEB Browser

The primary client interface is provided by an HTML web browser. Both Netscape navigator and Microsoft Internet Explorer are to be supported. The web browser must support the execution of Java 1.1 applets and at least HTML version 3.2. The following client terminal configurations must be supported:

- X Terminal with Netscape browser running on the element management system.
- Sun workstation with Netscape browser running on workstation.
- PC (Windows 95 or NT 4.0) with either Netscape or Microsoft IE running on PC.

WEB Pages

To provide web based network management access for the AP, web pages providing the following functionality must be developed. FIGS. 10, 11, 12 and 13 show sample page layouts):

1. Top level page: Initial entry to system. Presents a menu of options and potentially high level system status.
2. Network page: Hosts AP system level summary application
3. AP page: Hosts AP detailed NE status page for a single AP. A version of the page is constructed "on the fly" based on the AP logical number in the URL. The AP logical number and any other parameters are passed to the AP detailed NE status applet.
4. Alarms page: Hosts the Alarm list applet.

Note that page layout and navigation is determined by working with human engineering factors.

Client must be able to:
1. Access each page directly. Secure access (through web ID validation) must be provided for the initial access to these pages, but not for requests for subsequent pages as long as the same browser session is used.

Java-based GUI Infrastructure

This section describes base components that are necessary for implementing the AP specific GUI applets. A number of these components (especially the GUI components) may be satisfied (or based upon) commercial $3^{rd}$ party products (for example Rogue Wave JWidgets, or Microline's Grid widget). Also, $3^{rd}$ party non GUI container and algorithm classes (either Rogue Wave or JGL for example) should be considered to enhance the set that comes with the Java Development Kit.

The following sections describe applications that use this architecture.

AP Summary Application

This application provides summary information for all AP processors in the system. The summary information consists of the highest alarm level, administrative state and equipage status of all AP processors. Any changes to the configuration of displayed summary information are updated on the display within 30 seconds of the change. State changes are to be displayed within 15 seconds of the state change in the AP. In addition to presenting summary and equipage information, the application supports navigation to detailed status pages for each of the AP processors. It also provides a pop up menu (and any necessary dialog boxes) for execution of AP commands (e.g. RMV AP). A command response area or dialog box is also provided for display of command responses.

This application initiates a session with the element management system server (through the Client Session object) and registers with the network element service objects (the AP object) for the configuration information and attributes that it needs to provide a display of the AP network element summary (e.g. highest alarm level and status summary). An initial set of attribute values is delivered to the client and any subsequent changes to those attributes are delivered (from the summary alarm/status manager in the service object). Note that only the changed attributes are delivered in the subsequent callbacks unless the client requests a "reload" of attributes.

A sample Network Web page can be found in the attachments.

Network Element (NE) Detailed Status Application

This application presents a detailed view of the status of maintenance units within an AP network element. Any changes to the configuration of displayed summary information are updated on the display within 30 seconds of the change. State changes are to be displayed within 15 seconds of the state change in the AP. This application initiates a session with the object server (through the System object) and registers with the AP service objects (specific network element instance and maintenance units) for attributes that it needs to provide a display of the AP element status. An initial set of attribute values is delivered to the client and any subsequent changes to those attributes are delivered (from the attribute manager in the service object). Note that only the changed attributes are delivered in the subsequent callbacks unless the client requests a "reload" of attributes. The detailed status application may also provide context sensitive command execution through the use of pull down (or pop up) menus. The interface for command execution and display of command results is the same as the interface described in the "Command Handler" section above.

A sample AP Web page can be found in the attachments.

Alarm List (Active Alarm Browser) Application

This application provides an alarm browser interface to active alarms within the system. The client can specify a filter to limit the set of alarms (e.g. by network element, alarm level etc). The application registers it's filter and a callback function with the active alarm manager through the EMAPI 55. An initial set of active alarms matching the filter criteria is delivered to the client along with subsequent updates to set or clear alarms. Upon graceful termination the client disconnects from the active alarm manager (or an internal audit in the active alarm manager detects this and cleans up).

A sample Alarms Web page can be found in the attachments.

Locale Text Formatting Services

This service provides the infrastructure for multiple human language support. This service is used by any application that interacts with an end client through display of text: this includes the ROP formatting process, the web-based client applications, and any local logging on the element management system.

The following functionality will be provided:
- Access to a database of text formatting strings used by clients for formatting
- Lookups are based on an integral key and a corresponding ASCII string is returned The database contains key and ASCII values and will reside on disk. The storage format and caching mechanisms will be designed so minimize lookup speed.

Both local and remote clients can be served.

Adherence to X/Open CAE (XPG4) source message file format.

Commands and Reports

Each managed object class will adhere to the interface specified by the managed object base class (provide for client attribute registration, notification, configuration registration and notification), and will manage equipage, alarm and status for all instances of managed objects in that class. Each class will also provide methods to implement managed object specific commands. These methods will incorporate appropriate argument validation (e.g. range checks, target network element is equipped before the command is executed.

Besides the AP generated reports, the element management system will generate reports for the following conditions: communication is lost with an AP, communication is established with an AP (cold start trap), and all APs are out of service.

Overload Control

Overload control in the element management system server is accounted for primarily in the design (as opposed to here in this document). Specifically, status requests (polling, auditing and one-time GET requests) are limited by the number of simultaneous HPOV sessions supported by the element management system and the size of the tunable sliding window managed for each AP. Further, the event stream is limited by the throttling mechanism implemented by each SNMP agent. On the client side, the element management system will support a limited number of active client sessions, each of which may run a limited number of applications. The bottom line is there won't be enough network or client generated traffic to warrant the development of additional overload controls for the first phase.

Additional development should extend overload controls to safeguard against an uncontrolled event stream, and monitor and restrict the number and scope of client requests associated with each application.

The following areas of concern have been identified and will be used as the starting point to examining overload control:

Client Overload:
  Registering for too high a volume of data
  Creating too many sessions: note that adequate resources are currently allocated for internal server sessions
  High-frequency callbacks (traps for example)
Server Overload:
  Too high a volume of polling from SNMP Mediator to NE agents
  Trap floods: too many traps received over short period from NE agents Software Version Management The plan of record for overall AP/element management system/ECP software version management is as follows:
  For software retrofit for other applications, the element management system Server and the AP are retrofited to the same new version of element management system software.

At element management system Software Update:
  The element management system Server is updated first
  The APs are updated one at a time
  The element management system Clients will detect the element management system Server is down, and will need to reinitialize when the element management system Server is back online.

For element management system SUs, the element management system software on the element management system server must be compatible with the old version and new version of software on the AP. To support this compatibility, the element management system server is required to support MIB versions j and j+1 simultaneously. Element management system version management extends to element management system client applications as well, which must have knowledge of the MIB version on a given AP and be able to act accordingly.

During a software retrofit application and element management system Server SU, the element management system Clients will go down and will need to re-initialize once the element management system server is back up. The definitive requirements for element management system GUI Client version management will be described in the element management system GUI Client Capability Requirements/High-Level Design document The design of the MIB is that it contains a very detailed description of the element management system/AP interface. The MIB is intended to serve as much as possible as a single element management system/AP interface definition. As such, its details may need to be modified more frequently than at each Generic Retrofit. The SU approach will not guarantee that an element management system Server running a different MIB version than a corresponding AP SNMP Agent will be able to conduct error-free operations, but rather will enumerate the possible ways a MIB could change from one release to another and will specify the way version mismatches in each case will be handled and the kind of error handling that will be needed. The overriding goal is to maximize a technician's ability to perform the method in accordance with the invention on any available AP even if that AP is not running the same MIB version as the element management system server.

Security

This functionality provides a method of client based access control of network elements, maintenance units and operations on network elements/maintenance units. Upon startup, a client application must register with the server by providing identification of the client host, port, client, and a password. The server retrieves the client record from local data services and returns a session object to the client noting the client's access permissions. This information may be used to provide some level of access control in the client application (e.g. deactivating menu element management system for maintenance operations that are not allowed). In any case, all client requests are validated at the server. Each managed object class requires the session identifier as a parameter to each public method. The access permissions associated with the session are examined before authorizing client execution (e.g. remove operation). Note that there is a predefined "system session" with global access permissions for use by infrastructure components which make use of the same interface definition.

The version of SNMP that will be used by this architecture is SNMP V2c. This version of SNMP provides no further security enhancements over the community name based security in SNMP V1. It provides no mechanism to authenticate the source of a management message, or to prevent eavesdropping on the messages on the network. Because of this, it is strongly recommended that the network that is utilized for the element management system to AP SNMP traffic be a closed network and not part of the service providers public LAN or intranet.

The command line interpreter application (which resides only on the element management system server) is applicable to any client with a login on the element management system server. Thus, the client based access control described above provides a means to restrict access on a command/client basis.

Major Sub-components of the AP

Figure 14:
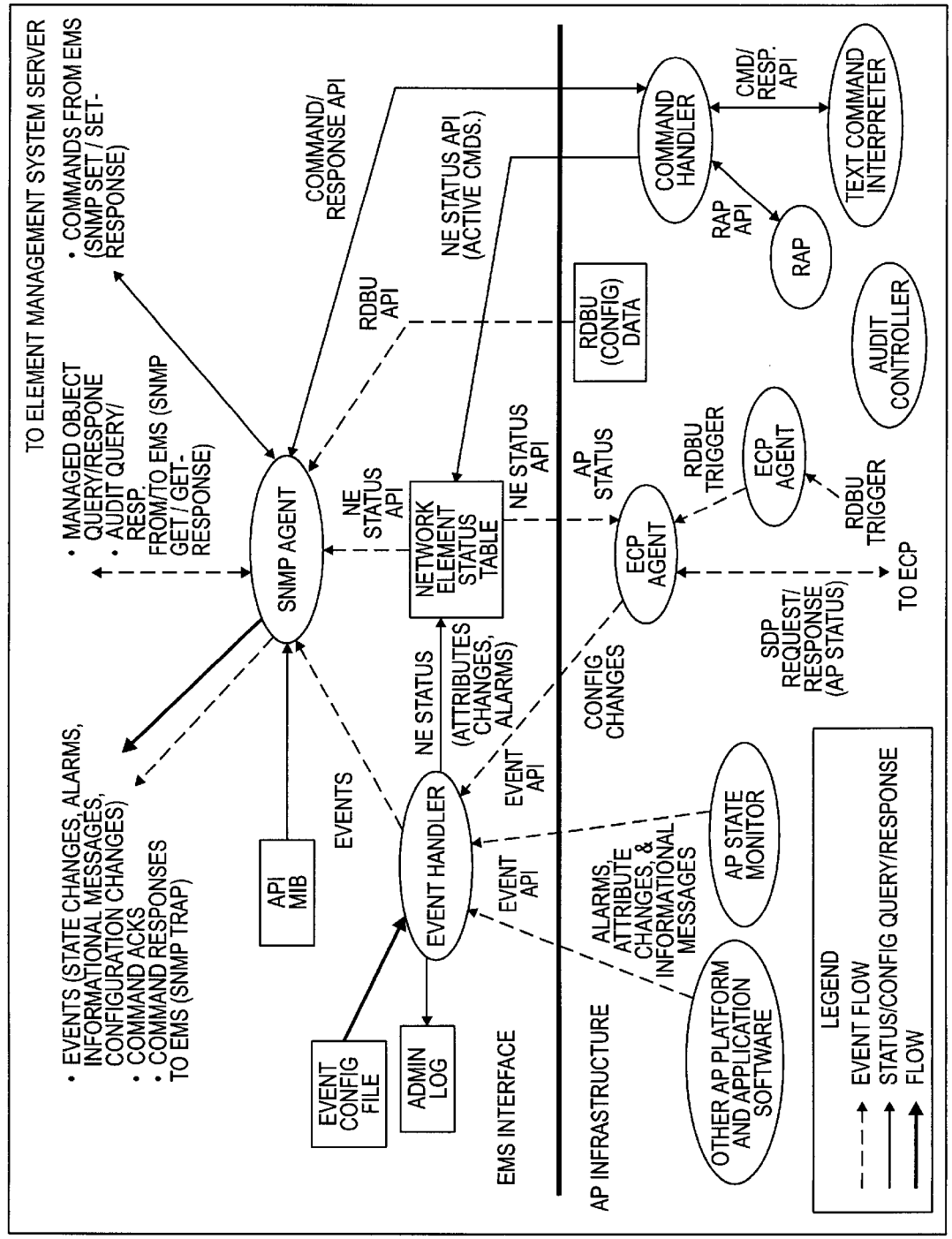
FIG. 14 is a functional block diagram of a network element, AP, software architecture.

A functional block diagram of the AP is shown in FIG. 14.

SNMP Agent: Provides the interface to the element management system Server using the SNMP protocol and a MIB defined specifically for the AP. Sends AP events and command acks/responses to the element management system Server as SNMP TRAPs; responds to requests for managed object data (SNMP GETs); passes command requests (SNMP SETs) to the Command Handler.

AP MIB: An SNMP MIB defined specifically for the AP. Contains the definition of all AP objects to be managed from the element management system Server, as well as the definition of all AP TRAPs to be sent to the element management system Server.

Agent Configuration File: contains values need by the Agent to communicate with the Manager, which resides on the element management system Server.

Event Handler: responsible for both the filtering and forwarding of events to the SNMP Agent. In response to events that are generated, updates the Network Element Status Table with data that is to be "remembered" by the AP (so that the element management system Server may query or poll for it later).

Event API: AP applications use this API to generate an event (state change, alarm, informational message, configuration). The event is passed to the Event Handler.

Network Element Status Table (NEST): a repository for all status that the element management system Server may query for. Current status, including state variables and list of outstanding alarms, for each Managed Object will be maintained here. In addition, the list of outstanding commands will be maintained here.

NE Status API: an interface for writing to and reading from the Network Element Status Table.

Event Configuration File (ECF): text file, (possibly editable by the technician), which defines which events are to be logged locally on the AP and/or passed to the SNMP Agent for transmission to the element management system Server. As per requirements, there will be a set of events that will always be logged and forwarded to the element management system Server—the technician will not be able to modify these. There may be other events defined (as the development phase proceeds) which may be edited by the technician. The ECF also defines X.733 values (e.g. severity) associated with alarms and informational messages.

Admin Log: file containing a customer-viewable log of events generated on the AP; which events are logged is controlled by the ECF.

The following sub-components are considered part of the AP infra-structure software.

Command Handler: manages all commands that are to be executed on the AP. Interfaces to a command source (also known as a Command Handler Access Point, or CHAP), such as the SNMP Agent, the AP Text Client, or the ECP Agent via the Command/Response API. Responsible for triggering and monitoring the command to be executed via the RAP API. Generates the command acknowledgment. Routes the command acknowledgment and command responses back to the command source. Maintains list of active commands in the NE Status Table.

Command/Response API: interface between a command source and the Command Handler for the purpose of issuing commands and obtaining command acknowledgments and responses.

RAP API: a general API for spawning a process and obtaining the results of the process execution. Generally, RAPs will be used to carry out a maintenance command on an AP resource. RAPs may spawn other processes, if necessary.

Text Command Interpreter: text-based command client for generating commands and receiving responses locally on the AP. Intended to be used when the element management system Server is unavailable.

IDS-AP: maintains the data tables of the IDS on the AP; receives triggers, representing changes in data, from the IDS on the ECP.

IDS (Configuration) Data: a repository for AP configuration data obtained from the ECP via IDS-AP.

IDS API: an API for obtaining configuration data provided by IDS-AP.

ECP Agent: interface to Status Display on the ECP; interface to IDS-AP for processing triggers indicating change in data. Passes triggers on to interested application processes.

Audit Controller: audits status and alarms among RCC, NEST, and resource managers (e.g. CCM)

AP State Monitor: detects and reports RCC-related state changes and alarms. This includes state changes and alarms reported by Resource Monitors RCC process monitoring software.

SNMP Agent

The element management system interfaces to the AP via the SNMP Agent. A MIB is used to define the interface between the element management system Server and the Agent and is common to both the element management system Server and the Agent. The Agent is described here and the MIB is described in the following section. The Agent communicates with the element management system Server using the Internet standard Simple Network Management Protocol (SNMP) (see Internet document RFC-1157) via a standard UDP/IP port. In this architecture, the intent is to use SNMPv2c, which provides enhanced capabilities over SNMPv1, such as the GETBULK operation.

SNMP provides three basic management functions:

GET (also GETNEXT and GETBULK): obtains data from a managed system (retrieves attributes associated with a managed object, as defined in the MIB). The managed system must respond to a GET with a GET-RESPONSE.

SET: usually used to make modifications to the managed system. The managed system must respond to a SET with a SET-RESPONSE. In this architecture, SETs are used to trigger commands to be executed on the AP.

TRAP: a way for the managed system to send asynchronous notifications to the Manager.

SNMP Agent Functionality

The SNMP Agent will perform the following basic functions:

I. Receive SNMP packets sent by the SNMP Manager at the element management system Server and process each one as follows:

A. GET/GET-NEXT/GETBULK packet: Obtain the current values of the managed object attributes requested in the packet by accessing either the Network Element Status Table or the Configuration (IDS) Data, as appropriate. The requested attributes and their values are stored in a GET-RESPONSE packet and returned to the Manager.

B. SET packet: Map an SNMP SET request into a command request message, as defined by the common Command/Response API. The command attributes, as specified in the SNMP packet and defined in the MIB, will be mapped in to corresponding message elements. The message will be passed to the Command Handler via the Command/Response API.

The Agent will send a SET-RESPONSE back to the Manager. If the SET request was invalid such that the Command handler could not determine a command to run, or if the command could not be passed to the Command Handler, the SET-RESPONSE will indicate an error. The Manager must interpret a SET RESPONSE error and generate a command acknowledgment indicating an error occurred.

The Agent must allow for the case where the Manager may send an identical SET request. This can occur if the Manager does not receive the SET-RESPONSE (lost). The Agent will remember the last SET request processed for a given client session (the client session info is defined in the MIB as common attributes for all commands) and will only pass the command to the Command Handler if the request is new. If the request is old, the Agent will simply send another SET-RESPONSE to the Manager.

II. Receive messages from the Command Handler and process each one as follows:

A. If the message is a Command Acknowledgment, map it into a Command Acknowledgment TRAP packet. The MIB will define a Command Acknowledgment TRAP that will be used for all commands. A command acknowledgment will take the form of a simple value to indicate the status of the command, such as the command was rejected, timed-out, is complete, or is in progress with command responses to follow.

B. If the message is a Command Response, map it into a Command Response TRAP packet. The MIB will define a common Command Response TRAP block that will be passed back in all command responses. In addition to the common Command Response TRAP block, there will be specific definitions in the MIB for each type of command response than can be generated. Note that there is no provision made to save Command Responses in case they are lost (perhaps the command response handling at the element management system Server can report on lost responses). Nor, is there any provision to guarantee that responses are returned in the correct order.

III. Receive messages from the Event Handler and process each one as follows:

A. Map the particular event into a corresponding TRAP packet. There are four possible types of events that can be received by the Agent and each event type will be mapped to a specific TRAP, as defined in the AP MIB.

1. State Change: indicates a change in value of one or more of the variables associated with a managed object. Managed object states will be maintained in the NE Status Table and the Manager may query the Agent for any or all states associated with the managed object. The Agent will map the variables and new state values in the event message into their corresponding MIB object identifiers and values in a TRAP packet, and send the packet to the Manager.

2. Alarm: indicates a condition of an unexpected nature which requires special and persistent technician notification. May also be used to indicate a clearing of such a condition. Each alarm is associated with a managed object and has a definition specific to that managed object in the MIB. There is an alarm block defined in the MIB that is common to all alarms. Alarms, like managed object states, will be maintained in the NE Status Table, and the Manager may query for active alarms. The Agent will map the alarmed event into the common MIB alarm block plus the specific attributes defined for the managed object.

3. Informational message: is similar in substance to an alarm, but is a condition that does not require the persistence of an alarm. The intent of an informational message is a condition which requires logging (say at the element management system Server and/or on the ROP) but is either not considered important enough to be maintained as an alarm (i.e. persistent view to the technician), or is a condition which can not be automatically retired when the condition disappears. An alarm defines a condition which must be able to be retired, either automatically or as a result of some technician action. The Agent will map the Informational message event into the common MIB Informational message block plus the specific attributes defined for the managed object and send it to the Manager.

4. Configuration Change: indicates that the configuration data for a given managed object has changed in some way (i.e., the managed object was created or deleted, or the configuration data associated with the managed object was updated). The Agent will map the Configuration Change event into the common MIB Configuration Change block and send it to the Manager. The Manager is then responsible for querying the AP to obtain the new/updated configuration data.

IV. The Agent will throttle TRAPS going to the element management system Server so as not to overwhelm the Manager. Throttling will be based on a fixed maximum rate coming from the AP. The throttling performed by the Agent will be priority-based, such that command acks and responses would take precedence over configuration changes, which would take precedence over alarms, which would take precedence over informational messages. The details of TRAP throttling will be specified during the design phase.

SNMP Agent Initialization

In order to communicate with the SNMP Manager on the element management system Server, the Agent requires certain information:

1. The IP address of the SNMP Manager is required in order to send SNMP TRAPs; a standard hostname will be assumed to exist in the /etc/hosts file on the AP and the Agent will obtain the IP address of this host on startup. Default IP addresses will be setup at staging of the AP.
2. The SNMP read and write community strings. Community strings are a form of SNMP security: the strings that the Manager will send must match what the Agent is expecting in order for the Agent to allow a GET (read)/SET (Write). These strings will be obtained from a command-line option when the Agent is started. Command-line parameters are specified in the RCC configuration file.

The SNMP Agent will exist as part of the Element Management Infrastructure Platform Virtual Machine (PVM) on the AP, and as such will be started by the Reliable Cluster Computing infrastructure.

Upon startup, the SNMP Agent will perform the steps necessary to gain access to the NE Status Table and Configuration Data; determine the Manager's IP address (as stated above); and will send a standard SNMP Cold Start TRAP to the Manager.

The Agent will respond to SNMP GETs on the standard Internet "system" group objects. This is required by the HP OpenView package that is being used on the element management system Server.

AP MIB

The AP MIB is the data definition shared between the SNMP Manager on the element management system Server and the SNMP Agent on the AP. It contains the definition of
- Common attribute blocks ("headers"), such as those defined for commands, command acknowledgments, alarms, etc. (see "MIB Conventions" below).
- All state variables, commands, command responses, alarms, and informational messages associated with the objects that are to be managed from the element management system Server. The managed objects are intended to include the AP itself, RCS virtual machines, the ethernet, etc.
- Objects required for auditing, such as the list of active commands (so that the element management system Server may audit its view of outstanding commands with the AP's view).

MIB Conventions

As mentioned previously, several conventions will be applied to the MIB to support this architecture. They are listed in the following sections.

"Binary" versus "ASCII" Attributes

The intent is that the attributes defined in the MIB will, in general, be defined as binary values, as opposed to ASCII strings. This allows the text-formatting of the attribute values (at the element management system Server) to use locale text formatting (so that the text appears in the appropriate human language).

SNMP agents preferably support the above variable. It is used by the Manager to determine whether this is an MIB (supporting the other interface conventions described in this section), and also to provide a versioning mechanism to support MIB changes. Upon initialization, the Manager will attempt to perform a GET operation on this variable. If it does not exist, the Agent does not support the enhancements required by this architecture.

Common Command Block

To support command requests, the MIB must support a specific set of variables to allow for all parameters for command execution to be specified in an atomic operation. This set of variables is called the command block. The command block provides a way to "register" a command request with an identifying tag that is used to route the final response (delivered by a TRAP) to the originating requester. The command block will contain such parameters as:

A session ID that relates the command to a particular client session.

A command sequence that makes the command unique within a particular client session.

An object instance identifier (e.g. "7" for an "RCS" managed object) to identify the particular instance of the object that the command is to be performed on.

A command operation (e.g. REMOVE).

Additional parameters specific to the command are not part of the common command block.

Common Command Acknowledgment and Command Response Blocks

In order to route Command Acknowledgments and Command Responses back to the originating client, the TRAPs that are generated to produce acks and responses must contain the common command block attributes (see above) from the initial command request. Command Responses must also contain a response sequence and a flag indicating last response. The common command block attributes will be passed to the Command Handler by the SNMP Agent and must be returned from the Command Handler to the Agent (i.e. this must be part of the Command/Response API), so that the Agent can return them in a Command Response TRAP.

Common Alarm and Informational message Blocks

Alarms and Informational messages will have a common attribute block defined. Attributes such as alarm level, alarm cause, alarm ID (a unique value per outstanding alarm) will be defined.

Common Configuration Change Event Block

There will be a common attribute block defined for all Configuration Event TRAPs. Attributes such as the managed object instance identifier and the configuration operation (insert, update, delete) will be defined.

Unit Hierarchy Addressing within the MIB

SNMP MIBs currently provide only one method to structure data: a simple two-dimensional table with scalar-valued entries. This limited way of structuring MIB variables does not directly support the more complex structure of a network element such as a cell site. A cell site has many units, each of which has a set of variables specific to that unit. The units are structured in a hierarchy.

To reference a specific attribute (or a set of attributes) of a sub-unit lower in the hierarchy, a multi-column key consisting of an identifier for each unit in the hierarchy will be used (e.g. to reference a sub-unit like CCC 2, CCU 1, the last two digits of the SNMP object identifier would be "2.1"). The SNW GETNEXT operation supports a convention (which must be supported by the Agent) to request an attribute by specifying the multi-column key as an object identifier.

Note: Currently, there has been no such unit hierarchy deemed necessary for the AP managed objects.

Event Generation and Processing

Applications on the AP are responsible for generating events to reflect:
- Current status and alarms associated with AP managed objects.
- Changes in configuration data associated with AP managed objects.
- Informational messages that may be of interest to Network Management applications.

In order to prevent inconsistencies, it is assumed that one and only one application will be responsible for the status and alarms of a particular managed object instance, and thus, be responsible for maintaining an accurate view of the managed object at all times by use of the Event API.

The following sections describe the major components involved in event generation and processing.

Event API

The Event API provides a mechanism for applications on the AP to generate events, and communicate these events to the Event Handler for possible recording, logging and/or forwarding to the element management system Server. The API includes:

The definition of all possible events in the system. Each event will be classified into one of the four possible types of events, as discussed earlier in this document: state change, alarm, informational message, or configuration change.

A means to initialize the API. Internally, the API will use the UX inter-process communication library to send messages to the Event Handler.

A means to pass the alarm text associated with a given alarm occurrence. The text will be encoded in a machine- and language-independent form for transmission to the element management system. The means to encode text will be provided by a National Language Support (NLS) library.

A means to clear all alarms previously generated by this application. This is intended to be used when an application re-initializes and must clear all outstanding alarms related to all managed objects for which it is responsible. This capability may or may not be needed in Generic 13.

A means to clear all alarms associated with a particular managed object instance. This is intended to be used when a particular managed object is initialized or brought in to service. For example, there may be several outstanding alarms on a DS1 object related to in-service operation. When the DS1 goes out-of-service, the application managing the DS1 may want to clear all outstanding alarms on that DS1.

Event Handler

The Event Handler will exist as part of the Platform Virtual Machine on the AP, and as such will be started by the Reliable Cluster Computing infrastructure.

The major functions of the Event Handler are:

I. Read the Event Configuration File to determine which events are to be recorded (attribute changes and alarms), logged, and/or passed to the SNMP Agent for transmission to the element management system Server. The ECF also defines whether an event is an alarm or an informational message, and the X.733 values associated with alarms and informational messages.

II. Monitor the ECF (e.g. UNIX stat system call) on a regular basis to detect changes in the ECF.

III. Receive messages from applications on the AP and process each one as follows:

A. If the event is to be logged, do so.

B. If the event is one which requires recording (an attribute change or an alarm), update the NE Status Table using the NE Status API.

C. If the event is to be passed on to the element management system Server (by default, all events will be passed), send it to the SNMP Agent using the UX inter-process communication library.

Network Element Status Table

A repository for all non-configuration data that the element management system Server may query for. This includes:

Current managed object status, on a per-managed-object-instance basis.

List of outstanding alarms, on a per-managed-object-instance basis.

Active Command Table, so that the SNMP Agent has access to the list of commands that are currently outstanding from the element management system Server, for audit purposes.

Network Element Status API

Provides a mechanism to read and write the Network Element Status Table. The API blocks readers while the table is being updated so that the data is kept consistent (e.g., by using a semaphore). Supports "wildcard" clearing of alarms as described above in the "Event API" section. The intention is that the Event Handler will be the one and only one application that will use the write API, while other applications, such as the ECP Agent and the SNMP Agent, will use the read API.

Event Configuration File (ECF)

A text file, (possibly editable by the technician), which defines which events are to be logged locally on the AP and/or passed to the SNMP Agent for transmission to the element management system Server. Events that are required to be logged and passed to the element management system Server as defined by the system requirements will not be allowed to be changed. The ECF also allows the technician to set the X.733 values associated with alarms and informational messages. An ECF-checker application (e.g. shell/awk) will be written to prevent invalid modifications to the file.

Admin Log

An ASCII file, written by the Event Handler, that contains events that are to be logged as defined by the ECF, with common fields in a fixed format. This file will be based on the existing OMP Admin logging mechanism. The fields for Alarm entries will match the content and order of the fields that appear on the element management system Server Alarm List application and will be tab delineated. The amount of data contained in the Event Log will be maintained through the standard logfile mechanisms. Access to the Event Log will be through standard mechanisms (cut-through to the AP, use of a standard editor).

EMAPI

Overview

The Element Management System (EMS) provides a framework for monitoring and controlling network elements. Each physical and logical component in the network is modeled as a managed object, which the Server makes visible to distributed client applications through the facilities of the Common Object Request Broker Architecture (CORBA). EM Clients need only be concerned about the attributes and operations defined for each application managed object, and not the details of network-level protocol and the server infrastructure required to support object services. The following is the Element Management Application Programming Interface (EMAPI) 55 in accordance with the invention utilized by EM Clients.

EMAPI Object Definitions

Figure 15:
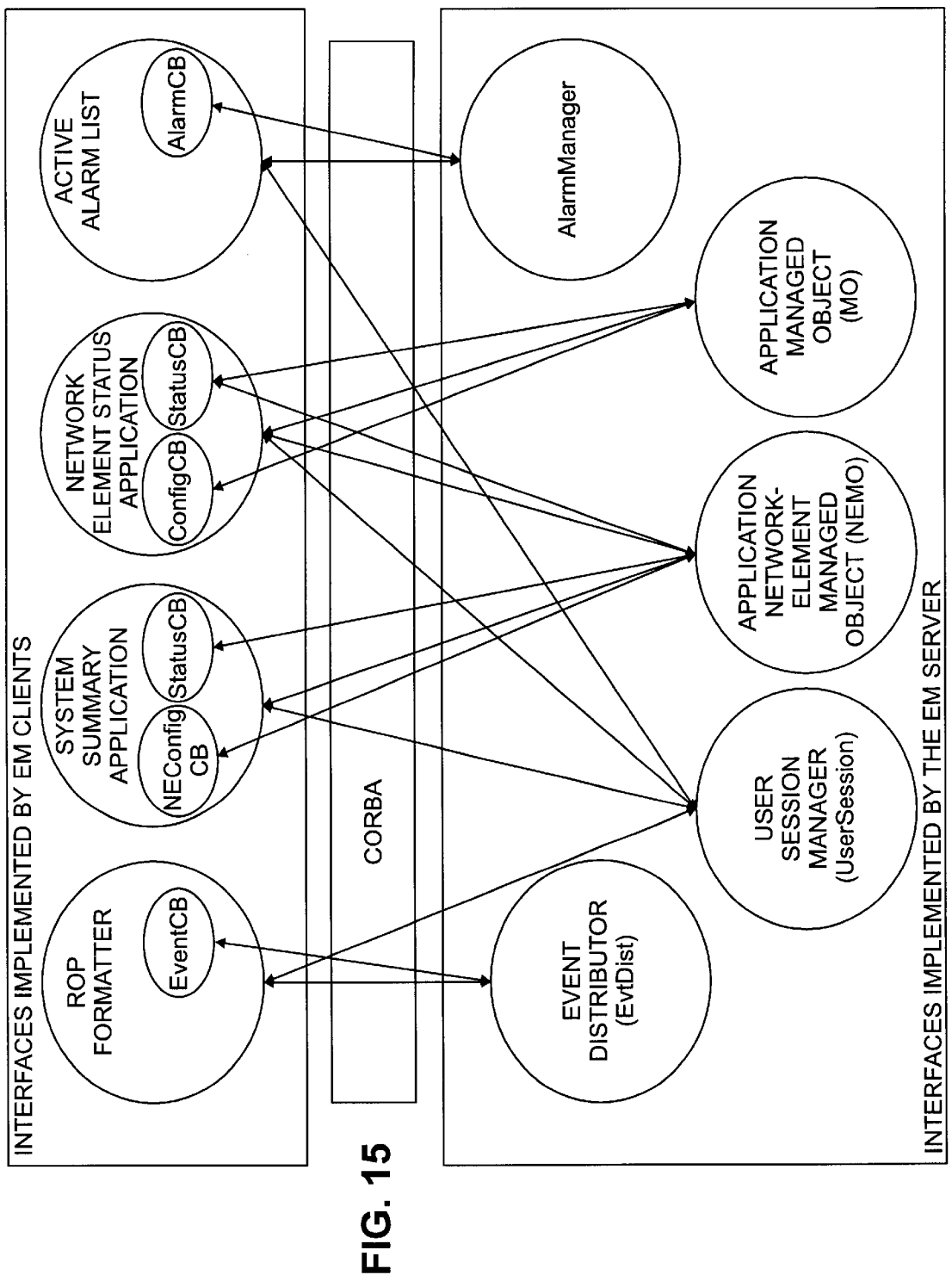
FIG. 15 shows element manager client application programming interfaces.

FIG. 15 shows all of the interfaces visible to client applications.:

FIG. 15 does not depict process or processor boundaries, which are made transparent by the client and server object request brokers (ORBs). Application services are provided through object interfaces formally defined in the CORBA Interface Definition Language (IDL).

The service objects resident on the server with which client applications interact are shown in Table 1 in FIG. 16.

Client applications which register for real-time status updates or notification of events, alarms or configuration changes must provide a reference to a local callback object which the Server will use to propagate information asynchronously. The callback interfaces defined in the EMAPI are listed in Table 2 shown in FIG. 17. Classes which implement these interfaces must be defined and instantiated in Client code.

Data Representation

There are several fundamental data types defined in the EMAPI, which fall into one of two categories shown in FIG. 18.

Session Management

Each EM Client session is logically associated with a login. Session identifiers are assigned by the EM Server when the client registers with the user session manager at initialization. Each Client application is logically associated with a session. Application identifiers are assigned by the Client. For the Element Manager Graphical User Interface, each "window" will be assigned a unique application id. Note that each Client is required to register a periodic heartbeat to validate for the Server that its associated session is still active.

The UserSession service object provides the following interfaces:

start

This method must be invoked by a Client at initialization to register a new session.

stop

A Client invokes this method to notify the Server that the associated session is terminating, and that all resources utilized by any of the applications associated with the session should be released.

stopApplication

A Client uses this method to notify the user session manager of termination of a single application.

heartbeat

This method must be invoked at least every UserSession-::HeartbeatPeriod seconds to avoid a timeout condition which, when detected by a Server audit, will result in the release of all resources utilized by any application associated with the respective session.

Managed Objects

Figure 19:
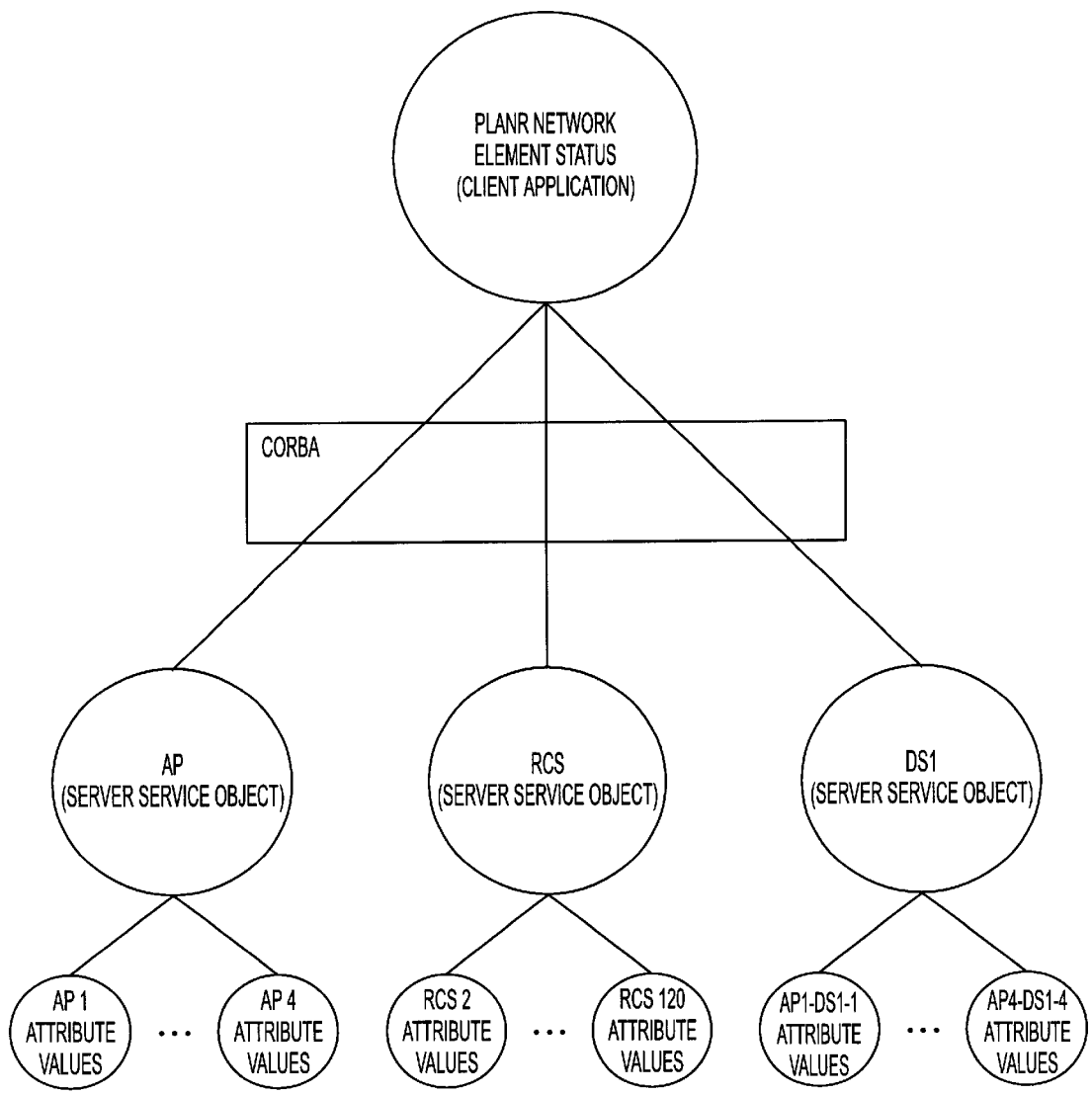
FIG. 19 shows the relationship between client, application, specific service object, and the internal server representation of managed object instances.

A managed object (MO) is an abstract representation of a physical or logical resource which may be managed by the EMS, such as a network element, maintenance unit or data link. The EM Server will implement one application-specific service object for each type of physical or logical resource to be managed. Each of these service objects defines a set of attributes which identify managed object properties, as well as the operations which may be performed on a specified managed object instance. (The decision to provide access to instance information through a single "service object" stems from the fact that current ORB implementations become unstable when managing large numbers of remote references.) The diagram shown in FIG. 19 depicts the relationship between Client, application-specific service object, and the internal Server representation of managed object instances.

Each managed object service class is uniquely identified by a ClassCode. Each managed object instance is uniquely identified by an InstId. Any object instance in the system may be uniquely referenced by a managed object identifier (Oid), which is the combination of ClassCode and InstId.

Managed object status information is reported by a service object as a sequence of attribute code-value pairs. Each attribute value is defined as a union of all of the EMAPI fundamental data types described in the section herein pertaining to DATA Representation Configuration information is reported as a sequence of ConfigData structures, which are defined to contain:

network element instance id managed object instance id a managed object key list reported as a sequence of attribute-value pairs (when length is greater than 0, the key list usually specifies one or more LogicalIds)

Each managed object service class must implement the MO interface, which defines the following configuration and status services:

viewconfig

A client uses this method to obtain the current EMS view of the managed object configuration for a specified network element instance. Note that the reserved instance identifier AnyInstance may be used to obtain configuration information for all network elements.

notifyConfig

A client may also register for managed object configuration information via callback. In this case, an initial view is returned with a notification type CONFIG_INIT.

Subsequent changes are reported with type CONFIG_CREATE or CONFIG_DELETE.

cancelNotify

A client uses this method to cancel registration for managed object configuration notifications associated with a specified client application.

getPersistent

A client may use this method to retrieve the set of attribute codes (SeqAttrCode) identifying all "persistent" data maintained by this service object. The associated attribute values for each managed object instance are stored and kept current irrespective of any client requests.

viewStatus

A client may invoke this method to obtain the EMS view of the current values for a specified set of persistent attributes for a specified managed object instance.

getStatus

A client may use this method to register for a snapshot of current status information. This interface differs from the previous one in that the requested attribute list may specify any managed object attribute codes—not just those associated with persistent data, and the information is returned via client status callback (StatusCB).

startUpdate

A client may also register for an initial view and notification of any updates to a list of selected attributes for a specified managed object instance. In this case, an initial view is reported via client callback with a notification type STATUS_INIT. Subsequent changes are reported with type STATUS_CHANGE. Note that managed object instance deletions are reported only through configuration change notification (to avoid a potential flurry of client callbacks when a network element is unequipped).

stopupdate

A client uses this method to cancel registration for managed object status updates.

getInst

A client may use this method to obtain a managed object instance identifier for a specified network element instance id and managed object key list.

Note that each method requires a client session application identifier (SessionAppId) to validate user access. In the case of configuration or status change notification registration, this identifier is also used to keep track of the additional server resources utilized while the client application is active.

Network Element Level Managed Objects

Each network-element level managed object must also implement the NEMO interface which defines additional network-element level configuration services:

viewNEconfig

A client may invoke this method to obtain the current EMS view of the network element configuration.

notifyNEconfig

A client may also register for network element-level managed object configuration information via callback. In this case, an initial view is returned with a notification type CONFIG_INIT. Subsequent changes are reported with type CONFIG_CREATE or CONFIG_DELETE.

cancelNEnotify

A client should use this method to cancel registration for network element managed object configuration updates.

Note that each method requires a client session application identifier to validate user access. In the case of configuration change notification registration, this identifier is also used to keep track of the additional server resources utilized while the client application is active.

Descriptive Entity Objects

Application objects of this type are defined to provide type and attribute information for abstract entities, such as data communicated between the EMS and network elements which are not part of a managed object description (e.g. SNMP trap definitions and command groups). Descriptive entity objects provide no implementation—they are defined and known by client applications at compile time.

Event Distributor

An event is reported as a combination of the following:
1. A header, which contains information of most general interest:
   Time of the event
   Event category defined to be one of the following:
      Alarm Set
      Alarm Clear
      Command Acknowledgment
      Command Response
      Configuration Change
      Informational Message
      Initialization
      State Change
   Network element object identifier
   Network element alarm level (meaningful only for alarm set)
   Maintenance unit object identifier (if applicable)
   Maintenance unit alarm level (meaningful only for alarm set)
   A command identifier (CmdId) defined as a user session id & command sequence number (meaningful only for command acknowledgment & response)
2. Event data defined as a sequence of structures which contain:
   A ClassCode of a managed object, network element or descriptive entity
   A sequence of attribute code-value pairs Client applications may request a copy of the event stream, as processed by the event distributor, filtered on information specified in the event header. Filter wildcards are implemented with "out-of-band" values:
   Any Category
   Any Class
   Any Instance
   Any Alarm
   Any Cmd The Table 3 described in FIG. 20 summarizes which filter criteria are valid for each event category:

The event distributor processes filters by examining the specified category and AND'ing together valid criteria. Clients may simulate OR operations by registering multiple filters.

The EvtDist service object implements the following client interfaces:

registerFilter

A client uses this method to register an event filter. A filter identifier is returned.

cancelFilter

A client invokes this method to remove a specified event filter, using the filter id returned from the associated registration.

Note that each method requires a client session application identifier to validate user access.

Alarm Manager

Alarm information is reported as a sequence of AlarmData structures which contain:
   The ClassCode of a managed object which defines a network-element specific alarm record. Note that in the first release of the EMS, only one network element active alarm table is defined (ApActiveAlarms).
   A sequence of alarm records, each of which contains an alarm instance identifier and sequence of attribute code-value pairs.

Client applications may request a copy of all active alarms filtered on any combination of the following:
   Network element Maintenance unit Alarm level Similar to the interfaces provided by the event distributor, out-of-band values may be used to represent wildcards.

Since managed object instance information may not be available at the time an alarm is reported, the actual alarm filter criteria are specified in terms of logical identifiers. Logical IDS are integer values which represent the logical numbers of devices and interfaces (e.g. AP 4). The correlation between logical ids and managed object instance identifiers is provided in the configuration information made available by each managed object service object, and through the utility method getInst. Refer to the section on Managed Objects for additional details.

The AlarmManager client interfaces are written specifically for the Active Alarm List application:

requestAlarms

A client invokes this method to register a filter for active alarms.

changeFilter

A client may invoke this method to change filter criteria.

refreshAlarms

A client may invoke this method to refresh the active alarm list.

cancelAlarms

A client should invoke this method to de-register a filter.

All operations except for de-registration return all active alarms filtered on the specified criteria. Also, each of these methods requires a valid client session application identifier to validate user access, and to keep track of the additional server resources which may be utilized while each client is active.

Exceptions

Exceptions are used for consistent and structured error handling in both the EM Server and Client.

The CORBA specification defines many system exceptions:

BAD_PARAM

INV_OBJREF

NO_PERMISSION

BAD_OPERATION

NO_RESPONSE

OBJ_ADAPTER

Refer to "The Common Object Request Broker: Architecture and Specification" for an exhaustive list of mnemonics and the associated exception descriptions.

Vendor-specific object request broker exceptions are also defined (using the Minor identifier of the SystemException):

NO_IT_DAEMON_PORT

LICENCE_EXPIRED

◆◆◆

Currently, the EMS uses Iona's Orbix product. Refer to the "Orbix 2.1 Reference Guide"" for an exhaustive list of mnemonics and the associated exception descriptions.

In FIG. 21 an EMAPI-specific exception is defined, with an EmapiExceptionCode containing one of a plurality of values.

In most cases, exceptions will be treated as fatal errors by a Client resulting in termination of all associated applications.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

APPENDIX A

DEFINITION OF TERMS

| Term | Definition |
| --- | --- |
| Alarm | A condition, usually of an unexpected nature, which requires special and persistent technician notification. |
| Active Alarm List Browser | A JAVA applet displaying the current active alarms in the system for all managed objects. A sample Active Alarm List Browser Applet can be found in Attachment 2 on the Alarms Web Page. |
| Applet | |
| ASN.1 | Abstract Syntax Notation One: A formal language used to define syntax. In the case of SNMP, ASN.1 notation is used to define the format of SNMP protocol data units and of objects. |
| AP | Application Processor refers to a commercial computing system that provides generic computing facilities. |
| APCC | Application Processor Cluster Complex: the highly-available platform, or cluster computing environment, in which an AP in the cluster can run the application services of another AP in the cluster should that AP fail. |
| AP EMS Infrastructure | The OA&M software architecture components that reside on the AP to support the APCC OA&M architecture. These include the MIB on the AP, the SNMP agent on the AP, the event handler, and other components described in section 4 of this document. |
| API | Application Programming Interface: a well-defined software interface, usually abstracting the details of the underlying implementation from the client of the interface. |
| Applet | small Java program which is dynamically downloaded by a Web browser and executed by its virtual machine. Though a Java applet has access to many of the services provided by the browser execution environment (e.g. audio, network access), it is also restricted by the browser Security Manager (e.g. no access to local file system). |
| Attribute | A property of a managed object. An attribute has a value. |
| Attribute Code | A code that identifies a specific attribute of a managed object class. |
| Class Code | An integer value which uniquely identifies a managed object class. |
| Client Callback Function | A function passed by the client to the server that is used by the server to deliver asynchronous notifications of attribute changes, configuration changes or event notifications. |
| EMAPI | Element Management Application Programming Interface |
| Event | Generally, an autonomous notification. We have defined four types of events that the AP can generate: alarms, reports, state changes, configuration changes. |
| IS-634 | An international standard suite that defines the interfaces required to attach base stations from one vendor to the MSC of another vendor. |
| IDL | Interface Definition Language: A C++-like notation for describing CORBA object interfaces. IDL is used to describe any resource or service a server component wants to expose to its clients without regard to its implementation language or operating system |
| Inheritance | The conceptual mechanism by which attributes, notifications, operations, and behavior are acquired by a subclass from its superclass. |
| Instance Identifier | An integer value that identifies a specific instance of a managed object and is unique within its managed object class. |
| JAVA | An object oriented programming language from Sun Microsystems that is interpreted, allowing applications to run on many platforms without change. |

APPENDIX A-continued

| | |
|---|---|
| Logical Identifier | An integer value which represents the logical number of a device or interface (e.g., AP4). Note that there is no direct correlation between a logical id and instance id. |
| Managed Object | An abstract representation of a resource that may be managed by the network management platform. Examples include a network element, a maintenance unit, network element summary, datalink. |
| Managed Object Class | A named set of managed objects that share the same sets of attributes, notifications and management operations. An example is the AP managed object class. |
| Managed Object Class Code | A code that identifies a specific managed object class (unique to the system). This code is a constant (enumeration or integer definition). |
| Managed Object Identifier | The combination of managed object class code and instance identifier defines the managed object identifier. Also abbreviated as an MOID. |
| Method or Operation | An operation or method on a managed object performs an action. |
| MIB | Management Information Base: a data definition of Network Element objects to be managed by a Element Manager, written in an Internet-standard language, specific to the SNMP protocol. |
| MMA | Message Mapping Application: the application which maps between the Autoplex Base Station Interface (ABI) call state and message sequence and the IS-634 call state and message sequence. MMA is sometimes referred to as Open A Interface (OAI). |
| Network Element | A functional component of the Autoplex system such as a cell site, Application Processor (AP), Call Processing Data Node (CDN), Executive Cellular Processor (ECP). |
| Network Element Detailed Status Applet | A JAVA applet depicting detailed status on the managed objects belonging to the network element. A sample view of the Network Element Detailed Status Applet can be found in Attachment 2 on the AP Web Page. |
| Network Element Status | Managed object attributes and their corresponding values that represent the status of the NE. The PlanR APCC NE status consists of status for the RCS-AP, and IS-634-AP managed objects, an active alarm list, and a table of outstanding commands. |
| Notification | Information sent by an agent to a manager when an event occurs at the associated network element. This includes alarmed and informational messages, notification of configuration changes within the network element, as well as acknowledgments to technician input commands. |
| OAI AP | An AP running the OAI application. |
| ORB | Object Request Broker |
| Object Identifier Persistent Attribute | The combination of managed object class code and instance identifier which uniquely identifies any managed object instance in the system. Information stored and kept current irrespective of any client requests (e.g., maintenance state). |
| RAP API | A general API for spawning a process and obtaining the results of the process execution. Generally, RAPs will be used to carry out a maintenance command on an AP resource. RAPs may spawn other processes, if necessary. |
| RCC | Reliable Cluster Computing. A Highly-Available (HA) product from Lucent Technologies that provides the software and hardware components to enhance the reliability, availability and maintainability of a HA or clustered system. |
| RCS | Radio Cluster Server. The application runs on the AP to provide call processing and OA&M functionality for the PlanR microcell. The software for this application is ported from the Radio Cluster Controller of a Series II cell. |
| RCS AP | The AP that hosts the RCS application. |
| Service Object | The object that provides services for a managed object class. Client applications acquire a reference to this object (in CORBA they bind to the object). An example is the AP service object and the Session service object. |
| Session | Each client must establish a unique session that is used to validate access permissions and for subsequent routing of notifications. |
| SNMP | Simple Network Management Protocol: an Internet-standard protocol for managing Network Elements from a Network Manager; provides three basic operations: GET, SET, and TRAP (autonomous notification). |
| SNMP Agent | The Software entity that resides on the Network Element and interfaces to the Network Manager via the SNMP protocol. This process listens on a specific UDP port in order to receive SNMP requests from the Manager and forwards TRAPs from the NE to the Manager. |
| SNMP Trap | An autonomous notification from the Network Element to the Network Manager. |
| State Change | A change in one or more of the attributes associated with a managed object. |
| Status Information | Current attribute values for a managed object instance. |
| System Summary Applet | A JAVA applet that displays a summary of the status of all network elements in the system. In Attachment 2, an example of the System Summary Applet can be found on the Network Web Page. |
| TI/OP | Technician Interface and Output Processor. The Autoplex subsystem where input commands and output reports are handled. |
| X Terminal | A type of client terminal that only displays the X protocol and can not host the EMS client applications. Instead, the client applications run on the Server and are displayed (via the X protocol) on the X terminal. |

GLOSSARY OF ACRONYMS

1. GLOSSARY

| | |
|---|---|
| ACF | Agent Configuration File |
| AP | Application Processor |
| APCC | Application Processor Cluster Complex |
| API | Application Programming Interface |
| ASN.1 | Abstract Syntax Notation One |
| C/S | Client/Server |
| CDPD | Cellular Digital Packet Data |
| CD-ROM | Compact Disk - Read Only Memory |
| CHAP | Command Handler Access Point |
| CMIP | Common Management Information Protocol |
| COGS | Cost of Goods |
| CORBA | Common Object Request Broker Architecture |
| DAT | Digital Audio Tape |
| DCI | Digital Computer Interface |
| DELPHI | Desktop Windows Visual Development Tool from Borland |
| EAI | Emergency Action Interface |
| EI | Emergency Interface |
| ECF | Event Configuration File |
| ECP | Executive Control Processor |
| ECPC | Executive Control Processor Complex |
| EIN | Ethernet Interface Node |
| EMAPI | Element Management Application Programming Interface |
| EMS | Element Management System |
| FTP | File Transfer Protocol |
| GUI | Graphical Client Interface |
| HA | High Availability |
| HA-OMP | High Availability Operations and Management Platform |
| HP | Hewlett Packard |
| HPOV | HP OpenView |
| HPOVNNM | HP OpenView Network Node Manager |
| HTML | HyperText Markup Language |
| HTTP | Hypertext Transfer Protocol |
| ICMP | Internet Control Message Protocol |
| IDL | Interface Definition Language |
| IDS | internal database subsystem |
| IP | Internet Protocol |
| ipmap | HPOVNNM component used to monitor up/down status of network elements |
| JAR | JAVA Archive |
| LAN | Local Area Network |
| LMT | Local Maintenance Terminal |
| Mbytes | Megabytes |
| MIB | Management Information Base |
| MMA | Message Mapping Application |
| MO | Managed Object |
| MOID | Managed Object Identifier |
| NE | Network Element |
| NEST | Network Element Status Table |
| NLS | Network Language Support |

APPENDIX A-continued

| | |
|---|---|
| NMS | Network Management System - obsolete term, replaced by EMS |
| OAI | Open A Interface |
| OA&M | Operations, Administration and Maintenance |
| OMG | Object Management Group |
| OMP | Operations and Management Platform |
| ORB | Object Request Broker |
| ovspmd | OpenView System Process Management Daemon |
| ovstart | HPOVNNM startup script, used to start up HP OpenView runtime |
| ovtrapd | OpenView Trap Daemon |
| ovw | OpenView Windows |
| ovwdb | HPOVNNM map database manager |
| pmd | PostMaster Daemon (part of HPOVNNM) |
| PVM | Platform Virtual Machine |
| RAP | Resource Administration Process |
| RCC | Reliable Cluster Computing |
| RCS | Radio Control System |
| ROP | Read Only Printer |
| SCANS | Software Change Administration and Notification System |
| SDP | Status Display Pages |
| SLIQ | Qmodem's defined scripting language |
| SNMP | Simple Network Management Protocol |
| SSL | Secure Socket Layer |
| SU | Software Update |
| TCP | Transmission Control Protocol |
| TI/OP | Technician Interface and Output Processor |
| UDP | Client Datagram Protocol |
| UX | UNIX subsystem |
| WAN | Wide Area Network |
| xnmevents | X Network Management Events Browser (part of HPOVNNM) |

What is claimed is:

1. In a telecommunications network having a plurality of network elements, a method of managing at least one of the network elements, comprising the steps of:

connecting a management computer to an element management server through a communication link including a computer internet;

coupling the at least one of the plurality of network elements to the element management server through the computer internet including coupling the at least one of the plurality of network elements to an associated applications processor with a management agent application for interfacing the element management server with the network element; and managing the at least one of the plurality of network elements via communications conveyed through the element management server between the management computer and the at least one network element, including the steps of receiving requests at the network element from a plurality of different management computers to poll for network element attributes which are the same, polling for the attributes which are the same only as if there were only one request for polling of the same attributes, and providing the results of the polling of the same attributes to all of the different management computers that requested polling of the same attributes.

2. The method of claim 1 in which the step of managing includes the steps of generating from the management server an interactive web page with objects associated with management of the at least one network element, transmitting the interactive web page from the management server through the computer internet to the management computer, and displaying the interactive web page at the management computer for management communications between the management computer and the at least one network element.

3. The method of claim 2 in which the objects of the interactive web page include objects associated with at least one of operation, administration and maintenance of the at least one network element.

4. The method of claim 3 in which the web page includes objects associated with all three of operation, administration and maintenance of the at least one network element.

5. The method of claim 2 including the step of generating signals through interaction with the interactive web page at the management computer to achieve at least one of command, control and fault management of the network element.

6. The method of claim 5 in which the step of generating includes the step of generating signals through interaction with the interactive web page at the management computer to achieve all three of command, control and fault management of the network element.

7. The method of claim 2 in which the interactive web page includes a menu of individual maintenance unit command options.

8. The method of claim 2 in which the interactive web page includes a detailed status summary page for the at least one individual network element.

9. The method of claim 2 in which the interactive web page includes a high level system status summary of all the plurality of network elements.

10. The method of claim 2 in which the interactive web page includes a list of all active alarms within the telecommunications network.

11. The method of claim 1 in which
the applications processor includes a maintenance application for performing maintenance of the network element, and the step of coupling includes the step of interfacing command request from the element management server through the management agent application to the maintenance application to selectively perform maintenance tasks.

12. The method of claim 1 in which the step of interfacing by the network element includes the step of providing the element management server with applications processor specific events and command acknowledgements.

13. The method of claim 1 in which the computer internet is the world wide web and the steps of connecting and coupling include the step of operating world wide web based JAVA applications at the management computer and the element management server.

14. The method of claim 1 in which the management agent application responds to various actions and the step of managing includes the step of correlating responses from the management agent application with the actions which caused the actions.

15. The method of claim 1 in which the step of managing includes the step of automatically routing command responses, polling results and traps back to the management computer.

16. The method of claim 1 in which the step of connecting includes the step of enabling the connection in response to entry of a correct password at the management computer.

17. The method of claim 16 including the step of encrypting the password prior to sending to the management server.

18. The method of claim 1 in which the step of managing includes the steps of selecting network element attributes from a plurality of network element attributes available for polling, and polling for only the selected network element attributes.

19. The method of claim 1 including the step of automatically updating a list of active alarms of the network element upon occurrence of either one of actuation of a new alarm and clearing of a former alarm.

20. In a communication network having a plurality of network elements, a method for managing a network element, comprising the steps of:

selectively running a management application at a plurality of different work stations for command, control and fault management of the network element;

interfacing an element management server through a computer internet to the plurality of different work stations to provide distributed network element management services to the management application at all of the plurality of work stations;

interfacing the network element with the element management server through a management agent application associated with the network element for communicating command acknowledgment and command requests through the computer Internet between the element management server and the network element using a simple node management protocol, and including the steps of establishing a set of SNMP service objects that communicate with the network element, establishing a SNMP mediator process that communicates with the SNMP service objects, polling for the SNMP service objects, and converting commands of a managed object to SNMP set commands;

monitoring the operation of events within the communication network; and diminishing the operation of events to prevent overloading of the communication system.

21. The method of claim 20 in which the element management server includes an object server having managed objects representing the network element and other resources of the system.

22. The method of claim 20 including the step of filtering events of the network element.

23. The method of claim 22 in which the events of the step of filtering events includes at least one of the events of alarm notification, state change and configuration change to the element network system server.

24. The method of claim 20 in which the step of interfacing the network element includes the step of maintaining within the element management server a list of current active alarms within the network.

25. The method of claim 20 in which the management application is written in JAVA, and the step of interfacing the work stations with the element management server is performed through an interactive web page that visually displays a menu of command, control and fault management options.

26. The method of claim 25 in which the web page includes a separate status summary display for each of the command, control and fault management options.

27. The method of claim 25 in which the web page includes a display of a list of active alarms for all network elements within the communication network.

28. In a telecommunications network having a plurality of network elements, a method of managing at least one of the network elements, comprising the steps of:

connecting a management computer to an element management server through a communication link including a computer internet;

coupling the at least one of the plurality of network elements to the element management server through the computer internet in which the network element has a management agent application;

managing the at least one of the plurality of network elements via communications conveyed through the element management server between the management computer and the at least one network element;

queuing multiple commands simultaneously received from a plurality of different management computers including the one management computer; and successive responding to the multiple commands by sending responses to appropriate ones of the different management computers that originated the commands, respectively.

* * * * *